United States Patent
Yonezawa et al.

(10) Patent No.: US 10,146,032 B2
(45) Date of Patent: Dec. 4, 2018

(54) ZOOM LENS AND IMAGING APPARATUS

(71) Applicant: FUJIFILM Corporation, Tokyo (JP)

(72) Inventors: Masaru Yonezawa, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/843,263

(22) Filed: Dec. 15, 2017

(65) Prior Publication Data

US 2018/0188511 A1    Jul. 5, 2018

(30) Foreign Application Priority Data

Jan. 5, 2017 (JP) ................ 2017-000495

(51) Int. Cl.
  *G02B 15/20* (2006.01)
  *G02B 7/02* (2006.01)
  *G02B 27/00* (2006.01)
  *G02B 7/04* (2006.01)
  *G02B 15/163* (2006.01)

(52) U.S. Cl.
  CPC ......... *G02B 15/20* (2013.01); *G02B 7/021* (2013.01); *G02B 7/04* (2013.01); *G02B 15/163* (2013.01); *G02B 27/0025* (2013.01)

(58) Field of Classification Search
  CPC .................................. G02B 15/20
  USPC ................................... 359/683
  See application file for complete search history.

(56) References Cited

U.S. PATENT DOCUMENTS

2010/0165476 A1* 7/2010 Eguchi ............. G02B 13/04
                                                  359/680

FOREIGN PATENT DOCUMENTS

| JP | 3513264 B2 | 3/2004 |
| JP | 2011-75646 A | 4/2011 |
| JP | 2013-33242 A | 2/2013 |
| JP | 2015-172651 A | 1/2015 |

* cited by examiner

*Primary Examiner* — James Jones
(74) *Attorney, Agent, or Firm* — Studebaker & Brackett PC

(57) ABSTRACT

The zoom lens consists of, in order from the object side, a first lens group that has a positive refractive power and remains stationary during zooming, a plurality of movable lens groups that move during zooming, and a final lens group that has a positive refractive power and remains stationary during zooming. The final lens group has two or more positive ED lenses formed of a material satisfying predetermined conditional expressions. The predetermined conditional expressions, which relate to extraordinary low dispersion and temperature coefficients of the refractive indices of the positive lenses in the movable lens group closest to the image side and the final lens group, are satisfied.

20 Claims, 11 Drawing Sheets

EXAMPLE 1

EXAMPLE 1

EXAMPLE 2

EXAMPLE 3

EXAMPLE 4

EXAMPLE 5

EXAMPLE 1

EXAMPLE 2

EXAMPLE 3

EXAMPLE 4

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2017-000495, filed on Jan. 5, 2017. The above application is hereby expressly incorporated by reference, in its entirety, into the present application.

BACKGROUND OF THE INVENTION

1. Field of the Invention

The present invention relates to a zoom lens suitable for electronic cameras such as broadcast cameras, movie imaging cameras, digital cameras, video cameras, and surveillance cameras, and to an imaging apparatus comprising the zoom lens.

2. Description of the Related Art

In the related art, in a zoom lens used for broadcast cameras and the like, in order to reduce the secondary spectrum of longitudinal chromatic aberration, a method of using positive lenses formed of extraordinary low dispersion glass is often used. However, extraordinary low dispersion glasses typified by S-FPL51 (manufactured by OHARA INC.) and S-FPL53 (manufactured by OHARA INC.) have negative temperature coefficients of refractive indices with large absolute values. Thus, in a case of using the glasses too often, variation in focus of the zoom lens (variation in imaging position) tends to occur during change in temperature. In view of the above, JP2013-33242A, JP2011-75646A, JP3513264B, and JP2015-172651A propose zoom lenses in which both reduction of the secondary spectrum and suppression of variation in focus during change in temperature are achieved.

SUMMARY OF THE INVENTION

Since broadcast cameras and movie imaging cameras generally employ interchangeable lenses, the flange focal length is adjusted before imaging, and the focal point of the lens and the position of the imaging element of each camera are matched. However, in a case where the flange focal length greatly deviates due to the environmental change after the adjustment of the flange focal length, readjustment of the flange focal length becomes necessary.

In addition, it is common for a zoom lens used for a broadcast camera and/or a movie camera to perform focusing within the lens group closest to the object side, and the focus sensitivity of such a zoom lens (an amount of movement of the image plane in a case where the lens groups moving during focusing moves by a unit movement) is smaller on the wide-angle side than on the telephoto side. For this reason, defocusing caused by environmental change tends to be problematic on the wide-angle side. From the above, the lens configuration of the lens group on the image side where the focus sensitivity at the time of environmental change is high on the wide-angle side is important.

In the lens system described in JP2013-33242A, study about the lens groups on the image side has progressed in that a material having a unique temperature coefficient of refractive index is used. However, since a resin is used, the coefficient of linear expansion tends to be large, change in shape of the lens tends to be caused by stress change in a case of change in temperature, and deterioration in performance tends to occur.

In the lens systems described in JP2011-75646A and JP3513264B, there is study about selection of the lens material. However, the lens group closest to the image side remaining stationary during zooming has a complex configuration. As a result, the length of the lens group closest to the image side in the direction of the optical axis increases, and the optical system increases in size. Further, in the lens system described in JP3513264B, the secondary spectrum is not sufficiently corrected.

In the lens system described in JP2015-172651A, in a case of change in temperature, variation in focus can not be corrected unless the whole or a part of the lens group closest to the image side remaining stationary during zooming is not moved. For that purpose, mechanical parts such as actuators, electrical parts such as control circuits, temperature sensors, and the like are necessary. That is, a temperature compensation control member other than the optical members is necessary for temperature compensation, and thus the entire apparatus increases in size.

The present invention has been made in consideration of the above-mentioned situations, and it is an object of the present invention to provide a zoom lens in which a special resin material and a temperature compensation control member other than optical members are not used while chromatic aberration can be satisfactorily corrected, in which variation in focus in a case of change in environmental temperature is small, and which can be configured to have a small size and has favorable optical performance, and an imaging apparatus comprising the zoom lens.

A zoom lens of the present invention consists of, in order from an object side: a first lens group that has a positive refractive power and remains stationary with respect to an image plane during zooming; a plurality of movable lens groups that move by changing distances in a direction of an optical axis between groups adjacent to each other during zooming; and a final lens group that has positive refractive power and remains stationary with respect to the image plane during zooming. The final lens group has at least two positive ED lenses formed of a lens material satisfying Conditional Expressions (1) and (2). At least one of the movable lens group closest to an image side and the final lens group has at least one positive lens other than the positive ED lenses. In addition, it is preferable that all Conditional Expressions (3) to (5) are satisfied.

$$62 < \nu d \tag{1}$$

$$0.64 < \theta gF + 0.001625 \times \nu d < 0.70 \tag{2}$$

$$4.0 \times 10^{-6} < (dN/dT)aveB < 8.2 \times 10^{-6} \tag{3}$$

$$0.7 \times 10^{-6} < (dN/dT)aveA < 4.0 \times 10^{-6} \tag{4}$$

$$0.655 < (\theta gF + 0.001625 \times \nu d)aveA < 0.670 \tag{5}$$

Here, νd is an Abbe number of the lens material at a d line,

θgF is a partial dispersion ratio of the lens material between a g line and an F line, (dN/dT)aveB is an average value of dN/dT of positive lenses other than the positive ED lenses in the movable lens group closest to the image side and the final lens group, (dN/dT)aveA is an average value of dN/dT of positive lenses in the movable lens group closest to the image side and the final lens group, (θgF+0.001625×vd)aveA is an average value of θgF+0.001625×vd of the positive lenses in the movable lens group closest to the image side and the final lens group, dN/dT is defined as a temperature coefficient of a refractive index in air at the d line, and is an average value in a temperature range of 0° C. to 40° C.

In the zoom lens of the present invention, it is preferable that a lens material of at least two positive ED lenses of the final lens group satisfies at least one of Conditional Expression (1-1) or (2-1).

$$70 < vd < 100 \tag{1-1}$$

$$0.65 < \theta gF + 0.001625 \times vd < 0.69 \tag{2-1}$$

It is preferable that the zoom lens of the present invention satisfies Conditional Expression (6), and it is more preferable that the zoom lens satisfies Conditional Expression (6-1).

$$-45 \times 10^{-6} < \frac{1}{\Phi Ge} \sum_{i=1}^{k} \Phi i \times (dNi/dT) < -5 \times 10^{-6} \tag{6}$$

$$-25 \times 10^{-6} < \frac{1}{\Phi Ge} \sum_{i=1}^{k} \Phi i \times (dNi/dT) < -5 \times 10^{-6} \tag{6-1}$$

Here, ΦGe is a refractive power of the final lens group, k is the number of lenses in the movable lens group closest to the image side and the final lens group, Φi is a refractive power of an i-th lens from the object side in the movable lens group closest to the image side and the final lens group, dNi/dT is dN/dT of the i-th lens from the object side in the movable lens group closest to the image side and the final lens group, and dN/dT is defined as a temperature coefficient of a refractive index in air at the d line, and is an average value in a temperature range of 0° C. to 40° C.

It is preferable that the zoom lens of the present invention satisfies Conditional Expression (7), and it is more preferable that the zoom lens satisfies Conditional Expression (7-1).

$$0.15 < ft \times (\tan \omega t)/fGe < 0.5 \tag{7}$$

$$0.25 < ft \times (\tan \omega t)/fGe < 0.45 \tag{7-1}$$

Here, ft is a focal length of the zoom lens at the telephoto end in a state where an object at infinity is in focus, ωt is a maximum half angle of view of the zoom lens at the telephoto end in a state where the object at infinity is in focus, and fGe is a focal length of the final lens group.

In the zoom lens of the present invention, it is preferable that a lens closest to the image side in the final lens group is a positive lens. In addition, it is preferable that Conditional Expression (8) is satisfied, and it is more preferable that Conditional Expression (8-1) is satisfied.

$$0.65 < DD2/DD1 < 0.85 \tag{8}$$

$$0.67 < DD2/DD1 < 0.81 \tag{8-1}$$

Here, DD2 is a distance on the optical axis between a lens surface closest to the object side in the final lens group and an image side lens surface of a second lens from the image side, and DD1 is a distance on the optical axis between the lens surface closest to the object side in the final lens group and a lens surface closest to the image side.

In the zoom lens of the present invention, it is preferable that a lens closest to the object side in the final lens group is a positive lens, and Conditional Expression (9) and (10) is satisfied. In this case, it is more preferable that at least one of Conditional Expression (9-1) or (10-1) is satisfied.

$$1.8 < Ndp \tag{9}$$

$$0.65 < \theta Fp + 0.001625 \times vdp < 0.67 \tag{10}$$

$$1.8 < Ndp < 1.95 \tag{9-1}$$

$$0.65 < \theta gFp + 0.001625 \times vdp < 0.66 \tag{10-1}$$

Here, Ndp is a refractive index of the positive lens closest to the object side in the final lens group at the d line, θgFp is a partial dispersion ratio of the positive lens closest to the object side in the final lens group between the g line and the F line, and vdp is an Abbe number of the positive lens closest to the object side in the final lens group at the d line.

In the zoom lens of the present invention, it is preferable that the final lens group has, successively in order from a position closest to the object side, a positive lens, and a cemented lens that is formed by cementing two lenses having refractive powers of which the signs are different from each other.

In the zoom lens of the present invention, it is preferable that focusing is performed by moving at least one lens in the first lens group in a direction of the optical axis.

In the zoom lens of the present invention, it is preferable that the first lens group consists of, in order from the object side, a first lens group front group that has a negative refractive power and remains stationary with respect to the image plane during focusing, a first lens group intermediate group that has a positive refractive power and moves in the direction of the optical axis during focusing, and a first lens group rear group that is set such that a distance in the direction of the optical axis between the first lens group rear group and the first lens group intermediate group changes during focusing and has a positive refractive power.

In the zoom lens of the present invention, it is preferable that the final lens group consists of ten or less lenses.

In the zoom lens of the present invention, the movable lens group closest to the image side may be configured to have a negative refractive power.

It is preferable that the zoom lens of the present invention satisfies Conditional Expression (11), and it is more preferable that the zoom lens satisfies Conditional Expression (11-1).

$$-2.0 < \beta Gew < -0.8 \tag{11}$$

$$-1.2 < \beta Gew < -0.82 \tag{11-1}$$

Here, βGew is a lateral magnification of the final lens group at a wide-angle end in a state where the object at infinity is in focus.

An imaging apparatus of the present invention comprises the zoom lens of the present invention.

In the present description, it should be noted that the terms "consisting of ~" and "consists of ~" mean that the zoom lens may include not only the above-mentioned elements but also lenses substantially having no powers, optical elements, which are not lenses, such as a stop, a filter, and a cover glass, and mechanism parts such as a lens flange, a lens barrel, an imaging element, and a hand shaking correction mechanism.

In addition, the term "~ group that has a positive refractive power" means that the group has a positive refractive power as a whole. It is the same for the term "~ group that has a negative refractive power". The "group" is not necessarily composed of a plurality of lenses, but may be composed of only one lens. Reference signs of refractive powers of the groups, reference signs of refractive powers of the lenses, surface shapes of the lenses, and radii of curvature of surfaces of the lenses are assumed as those in paraxial regions in a case where some lenses have aspheric surfaces. All the numerical values of the conditional expressions other than the partial dispersion ratio are based on the d line (a wavelength of 587.56 nm (nanometers)).

It should be noted that the partial dispersion ratio θgF between the g line and the F line of a certain lens is defined by θgF=(Ng−NF)/(NF−NC), where the refractive indexes of the lens at the g line, the F line, and the C line (a wavelength of 656.3 nm (nanometers)) are Ng, NF, and NC, respectively.

According to the present invention, the zoom lens consists of, in order from the object side, a first lens group that has a positive refractive power and remains stationary during zooming, a plurality of movable lens groups that move during zooming, and a final lens group that has a positive refractive power and remains stationary during zooming. By suitably setting the material of the lenses included in the movable lens group closest to the image side and the final lens group, it is possible to provide a zoom lens in which a special resin material and a temperature compensation control member other than optical members are not used while chromatic aberration can be satisfactorily corrected, in which variation in focus in a case of change in environmental temperature is small, and which can be configured to have a small size and has favorable optical performance, and an imaging apparatus comprising the zoom lens.

DESCRIPTION OF THE PREFERRED EMBODIMENTS

Figure 1:
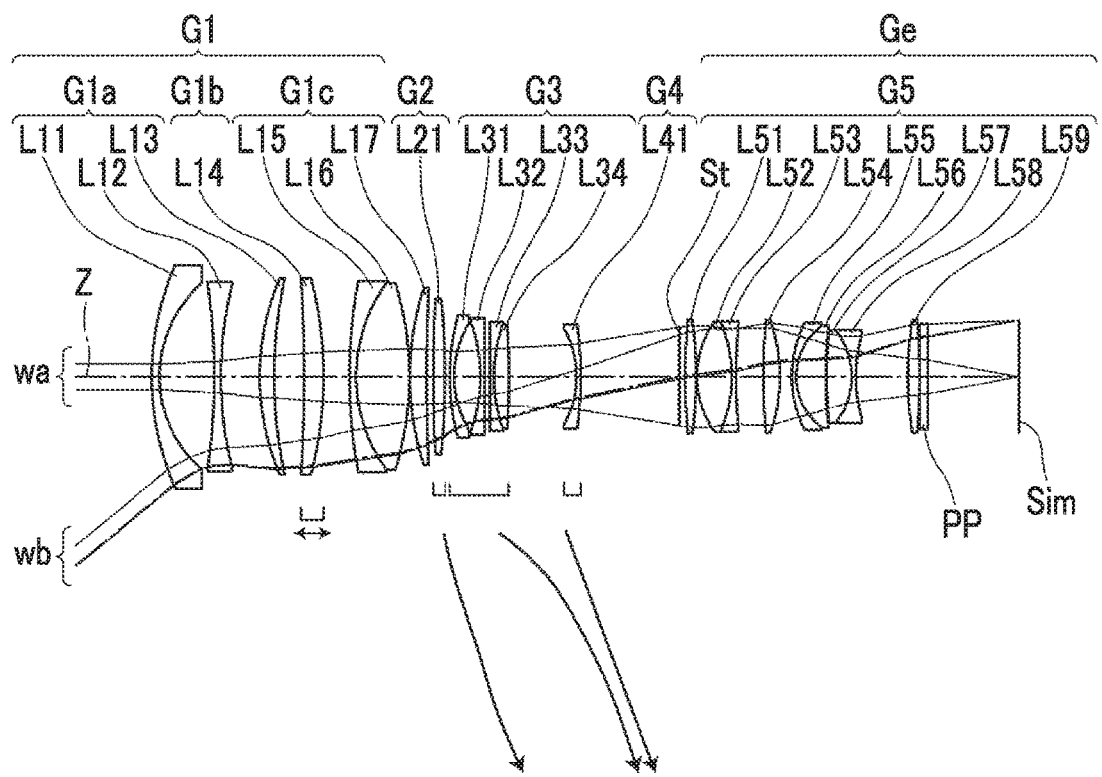
FIG. 1 is a cross-sectional view illustrating a configuration and an optical path of a zoom lens according to Example 1 of the present invention, where the upper part thereof shows the zoom lens in a wide-angle end state and the lower part thereof shows the zoom lens in a telephoto end state.
Figure 1:
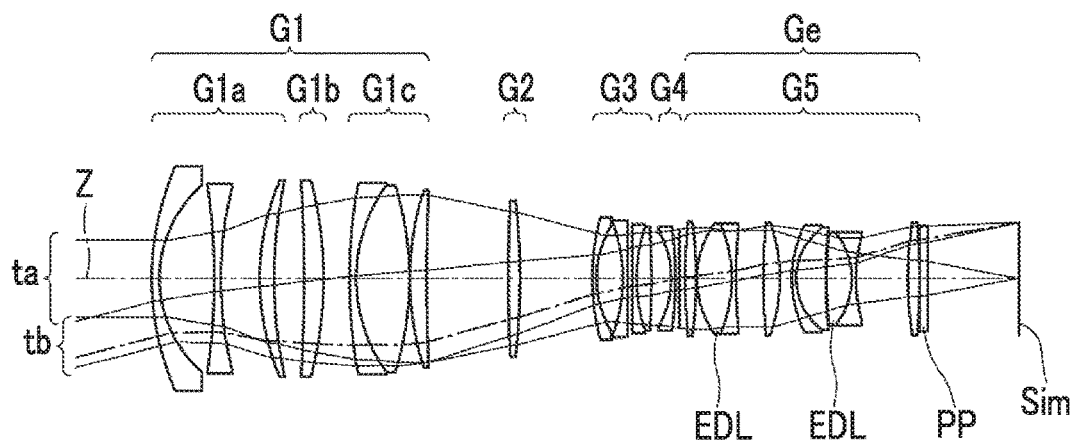

Hereinafter, embodiments of the present invention will be described with reference to drawings. FIG. 1 is a cross-sectional view illustrating a lens configuration and an optical path of a zoom lens according to an embodiment of the present invention. In FIG. 1, aberrations in the wide-angle end state are shown in the upper part indicated by "WIDE", on-axis rays wa and rays with the maximum angle of view wb are shown as rays. In addition, aberrations in the telephoto end state are shown in the lower part indicated by "TELE", and on-axis rays ta and rays with the maximum angle of view tb are shown as rays. It should be noted that the example shown in FIG. 1 corresponds to the zoom lens of Example 1 to be described later. FIG. 1 shows a state where the object at infinity is in focus, where the left side of the drawing is the object side and the right side of the drawing is the image side.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens consists of, in order from the object side to the image side along the optical axis Z: a first lens group G1 that has a positive refractive power and remains stationary with respect to the image plane Sim during zooming; a plurality of movable lens groups that move by changing distances in a direction of an optical axis between groups adjacent to each other during zooming; and a final lens group Ge that has positive refractive power and remains stationary with respect to the image plane Sim during zooming.

The zoom lens of the example shown in FIG. 1 consists of, in order from the object side to the image side along the optical axis Z, the first lens group G1, a second lens group G2, a third lens group G3, a fourth lens group G4, and a fifth lens group G5. During zooming, the first lens group G1 and the fifth lens group G5 remain stationary with respect to the image plane Sim, the second lens group G2, the third lens group G3, and the fourth lens group G4 move by changing mutual distances in the direction of the optical axis. In the example shown in FIG. 1, the second lens group G2, the third lens group G3, and the fourth lens group G4 each correspond to the movable lens group, and the fifth lens group G5 corresponds to the final lens group Ge. In the drawing of the upper part of FIG. 1, arrows, each of which schematically indicates a direction of movement of each lens group during zooming from the wide-angle end to the telephoto end, are shown below the second lens group G2, the third lens group G3, and the fourth lens group G4, respectively.

In the example shown in FIG. 1, the first lens group G1 consists of, in order from the object side, a total of seven lenses L11 to L17, the second lens group G2 consists of one lens L21, the third lens group G3 consists of four lenses L31 to L34 in order from the object side, the fourth lens group G4 consists of one lens L41, the fifth lens group G5 consists of, in order from the object side, an aperture stop St, and nine lenses L51 to L59. However, in the present invention, the number of movable lens groups disposed between the first lens group G1 and the final lens group Ge may be different from that in the example of FIG. 1, and the number of lenses constituting each lens group may be different from that in the example shown in FIG. 1, and the aperture stop St may be disposed at a position different from that in the example shown in FIG. 1. Further, the aperture stop St shown in FIG. 1 does not necessarily indicate its sizes and/or shapes, and indicates a position of the aperture stop St on the optical axis Z.

In this zoom lens, by forming the first lens group G1 closest to the object side as a positive lens group, it is possible to shorten the total length of the lens system, and thus there is an advantage in reduction in size. Further, by forming the final lens group Ge closest to the image side as the positive lens group, it is possible to suppress an increase in incident angle of the principal ray of the off-axis rays incident onto the image plane Sim. As a result, it is possible to suppress shading. In addition, by adopting a configuration in which the lens group closest to the object side and the lens group closest to the image side remain stationary during zooming, it is possible to make the total length of the lens system unchanged during zooming.

The final lens group Ge is configured to have at least two positive ED lenses EDL formed of a lens material satisfying Conditional Expressions (1) and (2). In the example of FIG. 1, the lens L52 and the lens L57 corresponds to the positive ED lenses EDL. At least one of the movable lens group closest to an image side and the final lens group Ge is configured to have at least one positive lens other than the positive ED lenses EDL. Then, the movable lens group closest to the image side and the final lens group Ge are configured to satisfy all Conditional Expressions (3) to (5).

$$62 < vd \quad (1)$$

$$0.64 < \theta gF + 0.001625 \times vd < 0.70 \quad (2)$$

$$4.0 \times 10^{-6} < (dN/dT)aveB < 8.2 \times 10^{6} \quad (3)$$

$$0.7 \times 10^{6} < (dN/dT)aveA < 4.0 \times 10^{6} \quad (4)$$

$$0.655 < (\theta gF + 0.001625 \times vd)aveA < 0.670 \quad (5)$$

Here, vd is an Abbe number of the lens material at a d line,

θgF is a partial dispersion ratio of the lens material between a g line and an F line, (dN/dT)aveB is an average value of dN/dT of positive lenses other than the positive ED lenses EDL in the movable lens group closest to the image side and the final lens group Ge, (dN/dT)aveA is an average value of dN/dT of positive lenses in the movable lens group closest to the image side and the final lens group Ge, (θgF+0.001625×vd)aveA is an average value of θgF+0.001625×vd of the positive lenses in the movable lens group closest to the image side and the final lens group Ge, and dN/dT is defined as a temperature coefficient of a refractive index in air at the d line, and is an average value in a temperature range of 0° C. to 40° C.

By using a material satisfying Conditional Expressions (1) and (2) simultaneously, it is possible to satisfactorily correct 1st-order and 2nd-order longitudinal chromatic aberrations. Incidentally, an optical glass, which simultaneously satisfies Conditional Expressions (1) and (2), generally has a characteristic that the temperature coefficient of the refractive index becomes negative in the temperature range of 0° C. to 40° C. That is, the optical glass, which simultaneously satisfies Conditional Expressions (1) and (2), generally has a characteristic that dN/dT<0. For example, a commonly called extraordinary low dispersion glass satisfies Conditional Expressions (1) and (2), and its dN/dT takes a negative value with a large absolute value.

The dN/dT of the ED positive lens EDL generally takes a negative value. On the other hand, by satisfying Conditional Expression (3), the average value of dN/dT of the positive lenses other than the ED positive lenses EDL in the movable lens group closest to the image side and the final lens group Ge is set as a positive value within a predetermined range. In a case where ambient temperature changes, the refractive index of each lens changes based on the value of dN/dT, and its focal length changes. As a result, the imaging position of the zoom lens changes. Therefore, the lens system having the final lens group Ge having at least two ED positive lenses EDL is configured to satisfy Conditional Expression (3). With such a configuration, even in a case where there is change in ambient temperature, variation in focus caused by the positive ED lenses EDL and variation in focus of the positive lenses other than the positive ED lenses EDL in the movable lens group closest to the image side and the final lens group Ge cancel each other. As a result, it is possible to reduce variation in focus of the entire zoom lens.

More specifically, by not allowing the result of Conditional Expression (3) to be equal to or less than the lower limit, it is possible to prevent over focusing from being caused by a high temperature. By not allowing the result of Conditional Expression (3) to be equal to or greater than the upper limit, it is possible to prevent under focusing from being caused by a high temperature. In order to enhance the effect relating to Conditional Expression (3), it is preferable that Conditional Expression (3-1) is satisfied.

$$4.1 \times 10^{-6} < (dN/dT)aveB < 8.1 \times 10^{-6} \quad (3\text{-}1)$$

By satisfying Conditional Expression (4), the average value of dN/dT for all the positive lenses in the movable lens group closest to the image side and the final lens group Ge can be set as a value within a predetermined range. As a result, it is possible to reduce variation in focus of the entire zoom lens in a case where ambient temperature changes.

More specifically, by not allowing the result of Conditional Expression (4) to be equal to or less than the lower limit, it is possible to prevent the effect of dN/dT of the positive ED lenses EDL from being excessive in a case of change in temperature. As a result, it is possible to prevent over focusing from being caused by a high temperature. By not allowing the result of Conditional Expression (4) to be equal to or greater than the upper limit, it is possible to prevent the effect of dN/dT of the positive lenses other than the positive ED lenses EDL in the movable lens group closest to the image side and the final lens group Ge from being excessive in a case of change in temperature. As a result, it is possible to prevent under focusing from being caused by a high temperature. In order to enhance the effect relating to Conditional Expression (4), it is preferable that Conditional Expression (4-1) is satisfied.

$$0.8 \times 10^{-6} < (dN/dT)aveA < 3.5 \times 10^{-6} \quad (4\text{-}1)$$

Conditional Expression (5) is a conditional expression relating to extraordinary low dispersion of all the positive lenses in the movable lens group closest to the image side and the final lens group Ge. By satisfying Conditional Expression (5), it is possible to satisfactorily correct the secondary spectrum. In order to enhance the effect relating to Conditional Expression (5), it is preferable that Conditional Expression (5-1) is satisfied.

$$0.656 < (\theta gF + 0.001625 \times vd)aveA < 0.667 \quad (5\text{-}1)$$

As described in SUMMARY OF THE INVENTION, defocusing caused by environmental change tends to be problematic on the wide-angle side, and the lens group on the image side in the zoom lens has a high focus sensitivity in a case of the environmental change on the wide-angle side. Therefore, the lens configuration of the lens group on the image side becomes important. Therefore, in the zoom lens according to the present embodiment, the movable lens group closest to the image side and the final lens group Ge are configured as described above, so as to suppress variation in focus in a case of change in temperature while satisfactorily correcting chromatic aberration.

It is preferable that the at least two positive ED lenses EDL of the final lens group Ge is formed of a lens material satisfying at least one of Conditional Expression (1-1) or (2-1).

$$70 < vd < 100 \quad (1\text{-}1)$$

$$0.65 < \theta gF + 0.001625 \times vd < 0.69 \quad (2\text{-}1)$$

By not allowing the result of Conditional Expression (1-1) to be equal to or less than the lower limit, it is possible to more satisfactorily correct 1st-order and 2nd-order longitudinal chromatic aberrations. By not allowing the result of Conditional Expression (1-1) to be equal to or greater than the upper limit, it is possible to satisfactorily correct various aberrations such as spherical aberration by securing a necessary refractive index while satisfactorily correcting longitudinal chromatic aberration. By satisfying Conditional Expression (2-1), it is possible to more satisfactorily correct 1st-order and 2nd-order longitudinal chromatic aberrations.

It is preferable that the zoom lens satisfies Conditional Expression (6).

$$-45 \times 10^{-6} < \frac{1}{\Phi Ge} \sum_{i=1}^{k} \Phi i \times (dNi/dT) < -5 \times 10^{-6} \quad (6)$$

Here, ΦGe is a refractive power of the final lens group Ge, k is the number of lenses in the movable lens group closest to the image side and the final lens group Ge, Φi is a refractive power of an i-th lens from the object side in the movable lens group closest to the image side and the final lens group Ge, and dNi/dT is dN/dT of the i-th lens from the object side in the movable lens group closest to the image side and the final lens group Ge.

Here, dN/dT is defined as a temperature coefficient of a refractive index in air at the d line, and is an average value in a temperature range of 0° C. to 40° C.

By satisfying Conditional Expression (6), it is possible to suitably set the relationship between the refractive power and the temperature coefficient of the lens in the movable lens group closest to the image side and the final lens group Ge. As a result, it is possible to suppress variation in focus in a case of change in temperature. By not allowing the result of Conditional Expression (6) to be equal to or less than the lower limit, it is possible to prevent the effect of dN/dT of the positive ED lenses EDL from being excessive in a case of change in temperature. As a result, it is possible to prevent over focusing from being caused by a high temperature. By not allowing the result of Conditional Expression (6) to be equal to or greater than the upper limit, it is possible to prevent the effect of dN/dT of the positive lenses other than the positive ED lenses EDL in the movable lens group closest to the image side and the final lens group Ge from being excessive in a case of change in temperature. As a result, it is possible to prevent under focusing from being caused by a high temperature. In order to enhance the effect relating to Conditional Expression (6), it is preferable that Conditional Expression (6-1) is satisfied.

$$-25 \times 10^{-6} < \frac{1}{\Phi Ge} \sum_{i=1}^{k} \Phi i \times (dNi/dT) < -5 \times 10^{-6} \quad (6\text{-}1)$$

It is preferable that the zoom lens satisfies Conditional Expression (7).

$$0.15 < ft \times (\tan \omega t)/fGe < 0.5 \quad (7)$$

Here, ft is a focal length of the zoom lens at the telephoto end in a state where an object at infinity is in focus, ωt is a maximum half angle of view of the zoom lens at the telephoto end in a state where the object at infinity is in focus, and fGe is a focal length of the final lens group Ge.

By satisfying Conditional Expression (7), it is possible to satisfactorily perform aberration correction while preventing the lens system from increasing in size. By not allowing the result of Conditional Expression (7) to be equal to or less than the lower limit, it is possible to prevent the focal length of the final lens group Ge from relatively excessively increasing. As a result, it is possible to prevent the final lens group Ge from increasing in size. By not allowing the result of Conditional Expression (7) to be equal to or greater than the upper limit, the positive refractive power of the final lens group Ge can be prevented from becoming excessively strong. As a result, it becomes easy to correct aberrations, in particular, spherical aberration of the final lens group Ge. In a case where spherical aberration is insufficiently corrected, it is difficult to realize a lens system having a small F number. In order to enhance the effect relating to Conditional Expression (7), it is preferable that Conditional Expression (7-1) is satisfied.

$$0.25 < ft \times (\tan \omega t)/fGe < 0.45 \quad (7\text{-}1)$$

In the zoom lens, it is preferable that a lens closest to the image side in the final lens group Ge is a positive lens and is configured to satisfy Conditional Expression (8).

$$0.65 < DD2/DD1 < 0.85 \quad (8)$$

Here, DD2 is a distance on the optical axis between a lens surface closest to the object side in the final lens group Ge and an image side lens surface of a second lens from the image side, and DD1 is a distance on the optical axis between the lens surface closest to the object side in the final lens group Ge and a lens surface closest to the image side.

By not allowing the result of Conditional Expression (8) to be equal to or less than the lower limit, the total length of the lens system can be prevented from becoming excessively long. By not allowing the result of Conditional Expression (8) to be equal to or greater than the upper limit, it is possible to satisfactorily correct field curvature and distortion, and it is possible to minimize an incident angle of the principal ray of peripheral rays incident onto the image plane Sim. In order to enhance the effect relating to Conditional Expression (8), it is preferable that Conditional Expression (8-1) is satisfied.

$$0.67 < DD2/DD1 < 0.81 \quad (8\text{-}1)$$

It is preferable that a lens closest to the object side in the final lens group Ge is a positive lens and is configured to satisfy Conditional Expressions (9) and (10).

$$1.8 < Ndp \quad (9)$$

$$0.65 < \theta gFp + 0.001625 \times vdp < 0.67 \quad (10)$$

Here, Ndp is a refractive index of the positive lens closest to the object side in the final lens group Ge at the d line.

θgFp is a partial dispersion ratio of the positive lens closest to the object side in the final lens group Ge between the g line and the F line, and vdp is an Abbe number of the positive lens closest to the object side in the final lens group Ge at the d line.

By not allowing the result of Conditional Expression (9) to be equal to or less than the lower limit, it becomes easy to secure the positive refractive power of the lens closest to the object side in the final lens group Ge, and it is possible to suppress an increase in size of the final lens group Ge.

Alternatively, the absolute value of the radius of curvature of the positive lens closest to the object side in the final lens group Ge can be prevented from becoming excessively small. As a result, there is an advantage in correction of high-order aberrations. It should be noted that the term "high order" described herein means 5th or more order.

It is more preferable that Conditional Expression (9-1) is satisfied.

$$1.8 < Ndp < 1.95 \quad (9\text{-}1)$$

By not allowing the result of Conditional Expression (9-1) to be equal to or less than the lower limit, it is possible to increase an effect of Conditional Expression (9). Generally, in a case where the refractive index of the existing optical material increases, the Abbe number tends to decrease. Thus, by not allowing the result of Conditional Expression (9-1) to be equal to or greater than the upper limit, there is an advantage in correction of 1st-order longitudinal chromatic aberration.

By satisfying Conditional Expression (10), it is possible to satisfactorily correct 2nd-order longitudinal chromatic aberration. In order to enhance the effect relating to Conditional Expression (10), it is preferable that Conditional Expression (10-1) is satisfied.

$$0.65 < \theta gFp + 0.001625 \times vdp < 0.66 \quad (10\text{-}1)$$

It is preferable that the zoom lens satisfies Conditional Expression (11).

$$-2.0 < \beta Gew < -0.8 \quad (11)$$

Here, βGew is a lateral magnification of the final lens group Ge at a wide-angle end in a state where the object at infinity is in focus.

By satisfying Conditional Expression (11), it is possible to satisfactorily perform aberration correction while preventing the lens system from increasing in size. By not allowing the result of Conditional Expression (11) to be equal to or less than the lower limit, it is possible to suppress the magnification of the aberration occurring in the lens group closer to the object side than the final lens group Ge. As a result, it becomes easy to correct aberrations, in particular, chromatic aberration on the telephoto side. By not allowing the result of Conditional Expression (11) to be equal to or greater than the upper limit, it is possible to prevent the size the lens closer to the object side to the final lens group Ge, particularly, the size of the first lens group G1 from increasing. In order to enhance the effect relating to Conditional Expression (11), it is preferable that Conditional Expression (11-1) is satisfied.

$$-1.2 < \beta Gew < -0.82 \quad (11\text{-}1)$$

It is preferable that the final lens group Ge has, successively in order from a position closest to the object side, a positive lens, and a cemented lens that is formed by cementing two lenses having refractive powers of which the signs are different from each other. It is to be noted that the term "the cemented lens that is formed by cementing two lenses having refractive powers of which the signs are different from each other" described herein may be a cemented lens which is formed by cementing a positive lens and a negative lens in order from the object side, or may be a cemented lens which is formed by cementing a negative lens and a positive lens in order from the object side. The first to third lenses from the object side in the final lens group Ge have the above-mentioned configuration. Thereby, it is possible to correct 2nd-order longitudinal chromatic aberration while preventing the height of the marginal ray on the axis from increasing through the positive lens closest to the object side in the final lens group Ge, and it is possible to satisfactorily correct 1st-order longitudinal chromatic aberration through the cemented lens.

It is preferable that the final lens group Ge consists of ten or less lenses. In such a case, it is possible to prevent the size of the final lens group Ge from increasing.

The movable lens group closest to the image side may be configured to have a negative refractive power. In such a case, the stroke of movement during zooming becomes small, and thus it is possible to shorten the total length of the lens system. Alternatively, the movable lens group closest to the image side may be configured to have a positive refractive power. In such a case, the height of rays entering the final lens group Ge becomes low, and thus there is an advantage in reduction in size.

For example, the plurality of movable lens groups disposed between the first lens group G1 and the final lens group Ge can be configured to consist of, in order from the object side, a lens group having a positive refractive power, a lens group having a negative refractive power, and a lens group having a negative refractive power. In such a case, by satisfactorily correcting distortion at the wide-angle end, the stroke of movement during zooming becomes small, and thus it is possible to shorten the total length of the lens system.

Alternatively, the plurality of movable lens groups disposed between the first lens group G1 and the final lens group Ge may be configured to consist of, in order from the object side, a lens group having a positive refractive power, a lens group having a negative refractive power, and lens group having a positive refractive power. In such a case, distortion at the wide-angle end is satisfactorily corrected, and thus there is an advantage in reduction in size of the final lens group Ge.

Alternatively, the plurality of movable lens groups disposed between the first lens group G1 and the final lens group Ge may be configured to consist of, in order from the object side, a lens group having a negative refractive power, and a lens group having a negative refractive power. In such a case, it is possible to simplify the zooming mechanism.

The zoom lens may be configured to perform focusing by moving at least one lens in the first lens group G1 in the direction of the optical axis. In such a case, it is possible to prevent defocusing during the zooming operation from occurring.

For example, as exemplified in FIG. 1, the first lens group G1 may be configured to consist of, in order from the object side, a first lens group front group G1$a$ that has a negative refractive power and remains stationary with respect to the image plane Sim during focusing, a first lens group intermediate group G1$b$ that has a positive refractive power and moves in the direction of the optical axis during focusing, and a first lens group rear group G1$c$ that is set such that a distance in the direction of the optical axis between the first lens group rear group G1$c$ and the first lens group intermediate group G1$b$ changes during focusing and has a positive refractive power. In such a case, it becomes easy to suppress change in angle of view caused by focusing. In FIG. 1, both arrows below the first lens group intermediate group G1$b$ indicate that the first lens group intermediate group G b is movable in the directions of the optical axis during focusing.

In addition, the first lens group rear group G1$c$ may remain stationary with respect to the image plane Sim during focusing. In such a case, the lens groups, which move during focusing, can be formed of only the first lens group intermediate group G1$b$, and it is possible to simplify the focusing mechanism. Thus, it is possible to suppress an increase in size of the apparatus. Alternatively, the first lens group rear group G1$c$ may move in the direction of the optical axis along a locus different from that of the first lens group intermediate group G1$b$ during focusing. In such a case, it is possible to suppress fluctuation in aberration during focusing.

The first lens group front group G1$a$ may be configured to have, successively in order from the position closest to the object side, a lens L11, which is a negative meniscus lens concave toward the image side, and a lens L12 which is a negative lens. In such a case, it is possible to obtain a negative refractive power necessary for achieving wide angle while suppressing occurrence of astigmatism.

The first lens group front group G1$a$ may be configured to consist of, in order from the object side, a negative meniscus lens that is concave toward the image side, a negative lens, and a positive lens. In such a case, aberration correction of the first lens group front group G1$a$, in particular, correction of chromatic aberration can be satisfactorily performed.

The lens closest to the image side in the first lens group front group G1$a$ may be a positive meniscus lens concave toward the image side. In such a case, it is possible to suppress occurrence of astigmatism on the wide-angle side, and there is an advantage in correction of spherical aberration on the telephoto side.

For example, the first lens group intermediate group G1$b$ may be configured to consist of only one lens. In such a case, it is possible to reduce the load on the focusing mechanism. In the example of FIG. 1, the first lens group intermediate group G1$b$ consists of one positive lens.

The first lens group rear group G1$c$ may be configured to consist of, in order from the object side, a cemented lens which is formed by cementing a negative lens and a positive lens in order from the object side, and a positive lens. In such a case, it becomes easy to correct chromatic aberration of the first lens group G1 and correct spherical aberration on the telephoto side.

It should be noted that the above-mentioned preferred configurations and available configurations may be arbitrary combinations, and it is preferable to selectively adopt the configurations in accordance with required specification.

Next, numerical examples of the zoom lens of the present invention will be described.

Example 1

A lens configuration of a zoom lens of Example 1 is shown in FIG. 1, and an illustration method thereof is as described above. Therefore, repeated description is partially omitted herein. The zoom lens of Example 1 consists of, in order from the object side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. In these five lens groups, the distances in the direction of the optical axis between groups adjacent to each other change during zooming. The movable lens groups are the second lens group G2, the third lens group G3, and the fourth lens group G4, and the final lens group Ge is the fifth lens group G5.

The first lens group G1 consists of, in order from the object side, a first lens group front group G1$a$ having a negative refractive power, a first lens group intermediate group G1$b$ having a positive refractive power, and a first lens group rear group G1$c$ having a positive refractive power.

During focusing, the first lens group front group G1a remains stationary with respect to the image plane Sim, the first lens group intermediate group G1b moves, and the distance in the direction of the optical axis between the first lens group intermediate group G1b and the first lens group rear group G1c changes.

The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of four lenses L31 to L34 in order from the object side. The fourth lens group G4 consists of one lens L41. The fifth lens group G5 consists of an aperture stop St and nine lenses L51 to L59 in order from the object side. The lens L52 and the lens L57 correspond to the positive ED lenses EDL.

Table 1 shows basic lens data of the zoom lens of Example 1, Table 2 shows specification and variable surface distances, and Table 3 shows numerical values relating to the temperature coefficient and the extraordinary low dispersion. In Table 1, the column of Si shows i-th (i=1, 2, 3, . . . ) surface number. The i-th surface number is attached to each of surfaces of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. It should be noted that the reference sign i in the basic lens data table is used independently of Conditional Expressions (6) and (6-1). In Table 1, the column of Ndj shows a refractive index of a j-th (j=1, 2, 3, . . . ) element at the d line (a wavelength of 587.6 nm (nanometers)), where j sequentially increases toward the image side when the surface of the element closest to the object side is regarded as the first surface. The column of vdj shows an Abbe number of the j-th element on the basis of the d line. The column of θgFj shows a partial dispersion ratio of the j-th element between the g line (a wavelength of 435.8 nm (nanometers)) and the F line (a wavelength of 486.1 nm (nanometers)).

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, a term of (St) is also noted. A value at the bottom place of Di indicates a distance between the image plane Sim and the surface closest to the image side in the table. In Table 1, the variable surface distances, which are variable during zooming, are referenced by the reference signs DD[ ], and are written into places of Di, where object side surface numbers of distances are noted in [ ].

In the range of Table 2, values of the zoom ratio Zr, the focal length f of the whole system, the F number FNo., the maximum total angle of view 2ω, and the variable surface distance are based on the d line. (°) in the place of 2ω indicates that the unit thereof is a degree. In Table 2, values in the wide-angle end state, the middle focal length state, and the telephoto end state are respectively show n in the columns labeled by WIDE, MIDDLE, and TELE. The values of Tables 1 and 2 are values in a state where the object at the infinity is in focus.

Table 3 shows temperature coefficients dN/dT of the lenses in the movable lens group closest to the image side and the final lens group Ge and numerical values θgF+ 0.001625×vd relating to the extraordinary low dispersion. The column of the lens in Table 3 shows the reference signs of the respective lenses, and the column of the surface number shows the surface numbers of the object side surfaces of the respective lenses.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj | θgFj |
|---|---|---|---|---|---|
| 1 | 71.81199 | 1.98483 | 1.910823 | 35.25 | 0.5822 |
| 2 | 32.04995 | 14.01276 | | | |
| 3 | −169.85281 | 1.70032 | 1.910823 | 35.25 | 0.5822 |
| 4 | 98.50747 | 10.07301 | | | |
| 5 | 64.50130 | 3.69556 | 1.808095 | 22.76 | 0.6307 |
| 6 | 117.95395 | 7.69065 | | | |
| 7 | −403.81604 | 5.00032 | 1.438750 | 94.66 | 0.5340 |
| 8 | −97.82956 | 6.60068 | | | |
| 9 | 134.88124 | 1.69910 | 1.688931 | 31.07 | 0.6004 |
| 10 | 41.15500 | 13.63281 | 1.537750 | 74.70 | 0.5394 |
| 11 | −81.84788 | 0.11921 | | | |
| 12 | 74.80796 | 4.29911 | 1.816000 | 46.62 | 0.5568 |
| 13 | 581.93071 | DD[13] | | | |
| 14 | 414.70166 | 2.98152 | 1.438750 | 94.66 | 0.5340 |
| 15 | −192.35317 | DD[15] | | | |
| 16 | 60.59836 | 1.10000 | 2.000694 | 25.46 | 0.6136 |
| 17 | 26.58276 | 6.71773 | | | |
| 18 | −41.83532 | 1.10000 | 1.592824 | 68.62 | 0.5441 |
| 19 | ∞ | 1.29967 | | | |
| 20 | ∞ | 1.11000 | 1.438750 | 94.66 | 0.5340 |
| 21 | 41.41600 | 3.79912 | 1.808095 | 22.76 | 0.6307 |
| 22 | −208.57686 | DD[22] | | | |
| 23 | −25.69507 | 1.10000 | 1.438750 | 94.66 | 0.5340 |
| 24 | −97.61823 | DD[24] | | | |
| 25(St) | ∞ | 1.55073 | | | |
| 26 | 161.82650 | 2.79382 | 1.846669 | 23.83 | 0.6190 |
| 27 | −112.24837 | 0.20018 | | | |
| 28 | 24.93850 | 8.88699 | 1.438750 | 94.66 | 0.5340 |
| 29 | −36.50700 | 1.10000 | 1.953748 | 32.32 | 0.5901 |
| 30 | 144.41888 | 7.03835 | | | |
| 31 | 202.67016 | 4.16093 | 1.805190 | 25.47 | 0.6101 |
| 32 | −45.05170 | 3.08688 | | | |
| 33 | 30.96070 | 1.10000 | 1.953748 | 32.32 | 0.5901 |
| 34 | 16.39300 | 7.70908 | 1.696797 | 55.53 | 0.5434 |
| 35 | 124.08371 | 0.24867 | | | |
| 36 | 119.27490 | 6.41000 | 1.438750 | 94.66 | 0.5340 |
| 37 | −19.73100 | 1.10000 | 1.854780 | 24.80 | 0.6123 |
| 38 | 41.19779 | 13.49915 | | | |
| 39 | 96.33050 | 3.00607 | 1.806100 | 40.93 | 0.5714 |
| 40 | −171.61879 | 0.00000 | | | |
| 41 | ∞ | 2.00000 | 1.516330 | 64.14 | 0.5353 |
| 42 | ∞ | 23.46519 | | | |

TABLE 2

Example 1

| | WIDE | MIDDLE | TELE |
|---|---|---|---|
| Zr | 1.00 | 2.00 | 2.97 |
| f | 18.59 | 37.18 | 55.22 |
| FNo. | 2.76 | 2.77 | 2.76 |
| 2ω(°) | 78.66 | 41.18 | 28.46 |
| DD[13] | 1.73 | 10.01 | 20.86 |

TABLE 2-continued

Example 1

| | WIDE | MIDDLE | TELE |
|---|---|---|---|
| DD[15] | 1.18 | 17.31 | 18.46 |
| DD[22] | 17.24 | 4.37 | 5.04 |
| DD[24] | 25.17 | 13.62 | 0.97 |

TABLE 3

Example 1

| Lens | Surface Number | dN/dT(/° C.) | θgF + 0.001625 × vd |
|---|---|---|---|
| L41 | 23 | $-6.10 \times 10^{-6}$ | 0.6878 |
| L51 | 26 | $10.04 \times 10^{-6}$ | 0.6577 |
| L52 | 28 | $-6.10 \times 10^{-6}$ | 0.6878 |
| L53 | 29 | $4.73 \times 10^{-6}$ | 0.6427 |
| L54 | 31 | $9.00 \times 10^{-6}$ | 0.6515 |
| L55 | 33 | $4.73 \times 10^{-6}$ | 0.6427 |
| L56 | 34 | $3.98 \times 10^{-6}$ | 0.6336 |
| L57 | 36 | $-6.10 \times 10^{-6}$ | 0.6878 |
| L58 | 37 | $4.27 \times 10^{-6}$ | 0.6526 |
| L59 | 39 | $9.24 \times 10^{-6}$ | 0.6379 |

Figure 6:
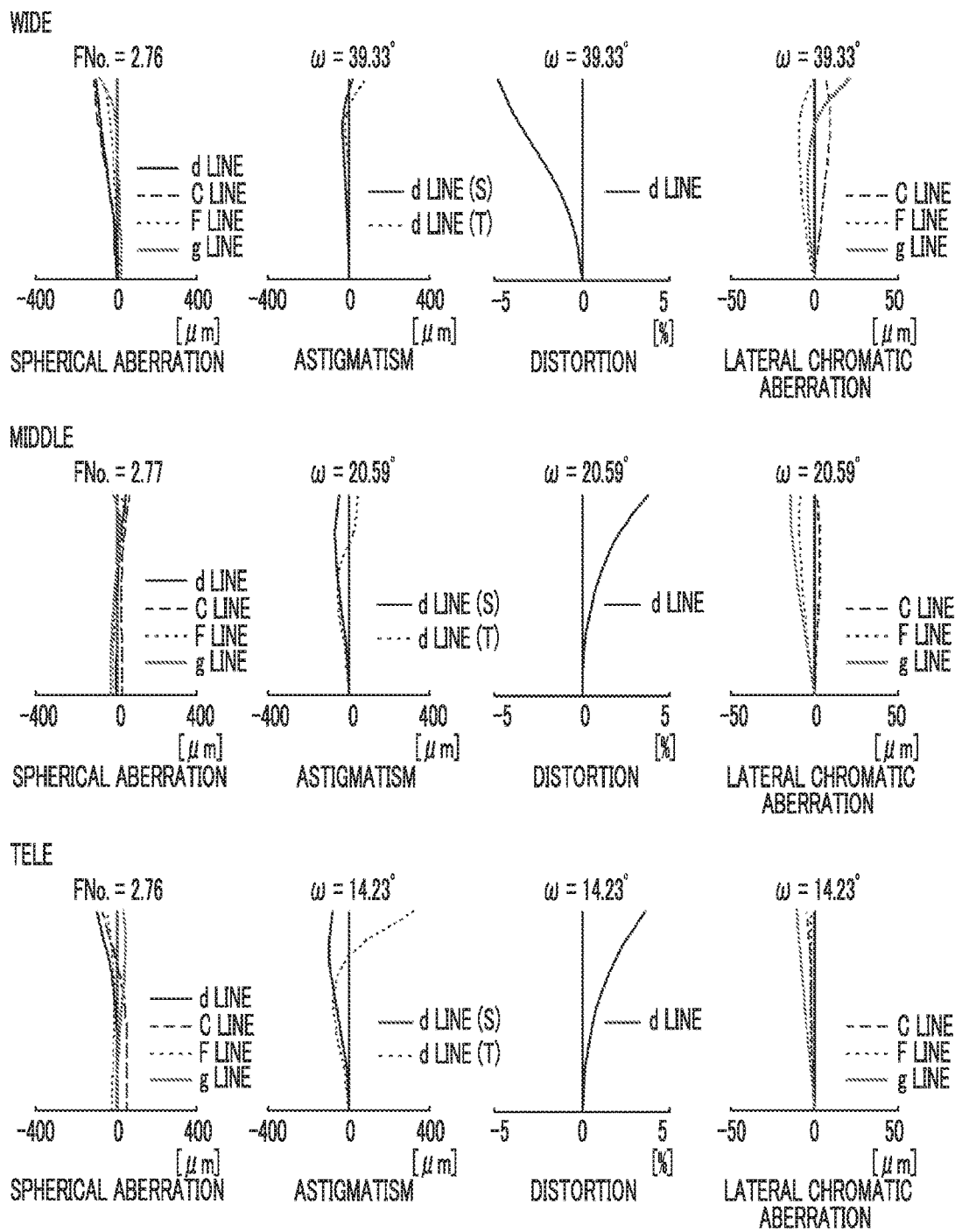
FIG. 6 is a diagram of aberrations of the zoom lens according to Example 1 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 6 shows aberration diagrams in a state where an object at the infinity is brought into focus through the zoom lens of Example 1. In FIG. 6, in order from the left side, spherical aberration, astigmatism, distortion, and lateral chromatic aberration are shown. In FIG. 6, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram. FNo, indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 2:
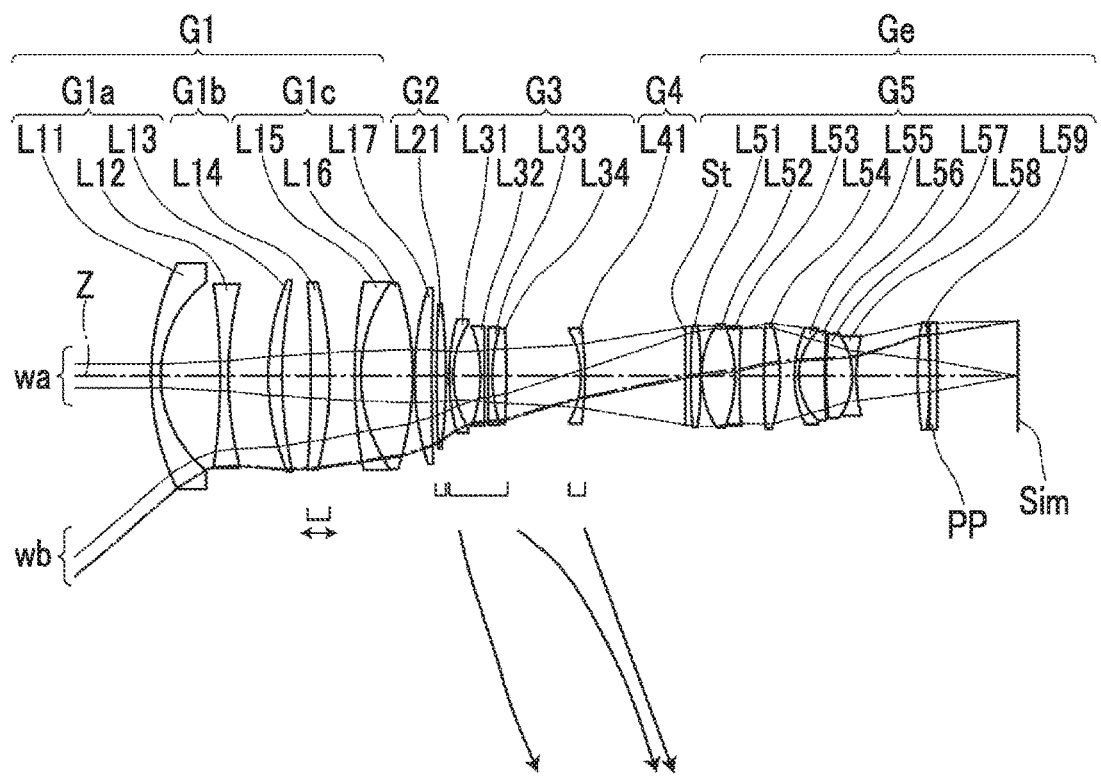
FIG. 2 is a cross-sectional view illustrating a configuration and an optical path of a zoom lens according to Example 2 of the present invention, where the upper part thereof shows the zoom lens in a wide-angle end state and the lower part thereof shows the zoom lens in a telephoto end state.
Figure 2:
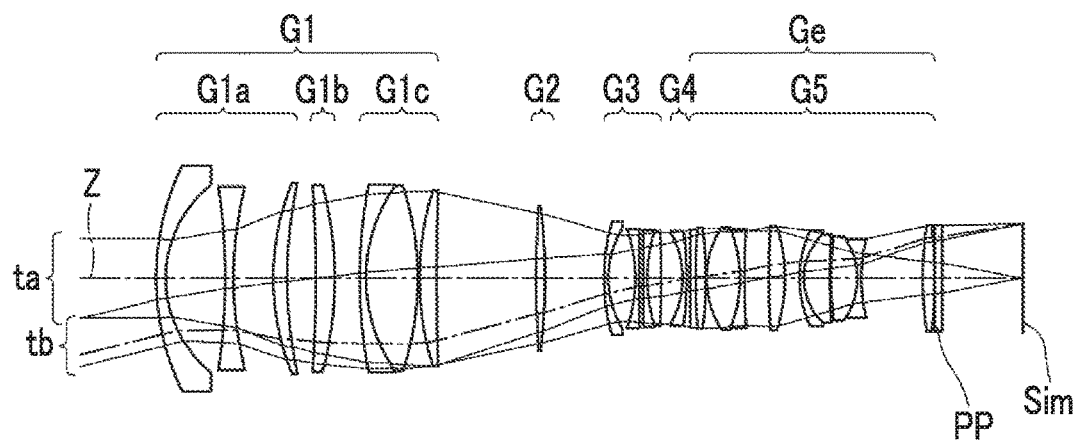

FIG. 2 shows a lens configuration and an optical path of a zoom lens of Example 2. The zoom lens of Example 2 is the same as that of Example 1 in terms of: the group configuration; the reference signs of the refractive powers of the respective lens groups; the lens groups that move during zooming; and the lens groups that move during focusing. The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of four lenses L31 to L34 in order from the object side. The fourth lens group G4 consists of one lens L41 in order from the object side. The fifth lens group G5 consists of an aperture stop St and nine lenses L51 to L59 in order from the object side. The lens L52 and the lens L57 correspond to the positive ED lenses EDL.

Figure 7:
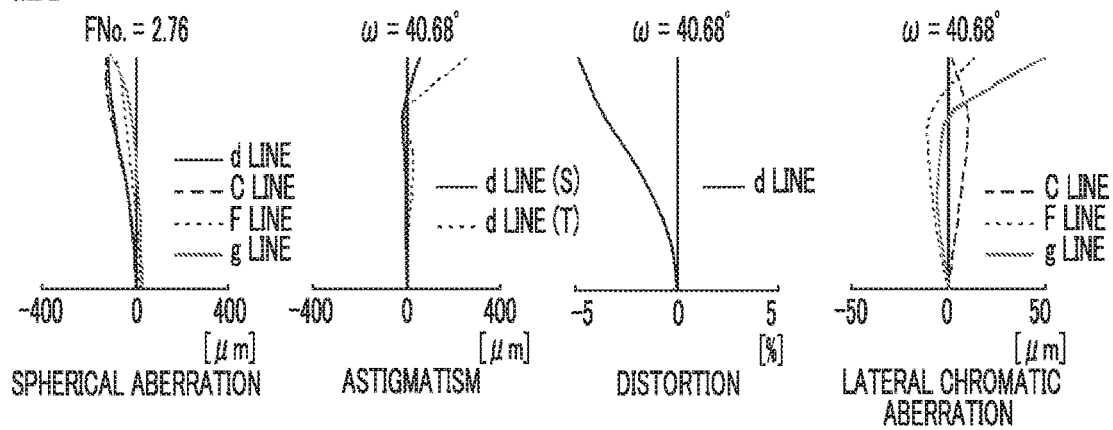
FIG. 7 is a diagram of aberrations of the zoom lens according to Example 2 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.
Figure 7:
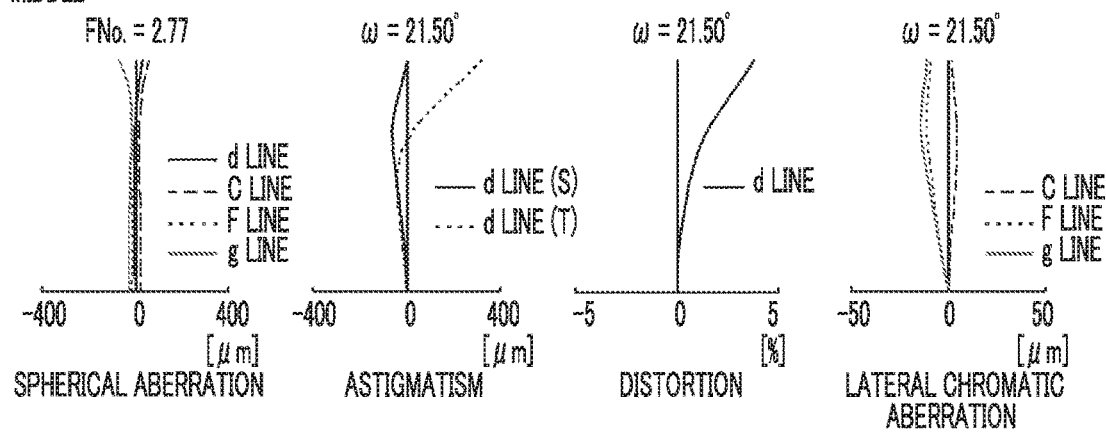
Figure 7:
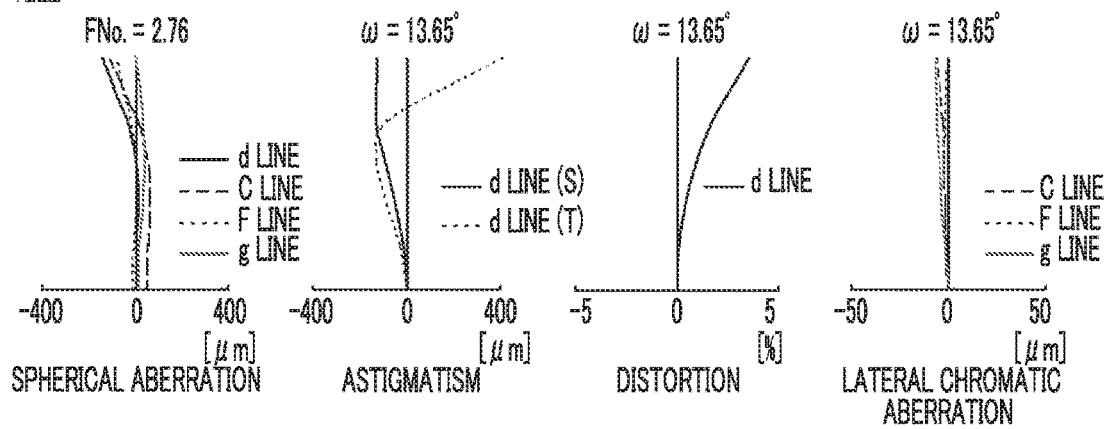

Table 4 shows basic lens data of the zoom lens of Example 2, Table 5 shows specification and variable surface distances, Table 6 shows numerical values relating to the temperature coefficient and the extraordinary low dispersion, and FIG. 7 shows aberration diagrams in a state where the object at the infinity is in focus.

TABLE 4

Example 2

| Si | Ri | Di | Ndj | vdj | θgFj |
|---|---|---|---|---|---|
| 1 | 75.12413 | 2.79806 | 1.910823 | 35.25 | 0.5822 |
| 2 | 35.07661 | 17.28709 | | | |
| 3 | −183.39794 | 2.40161 | 1.910823 | 35.25 | 0.5822 |
| 4 | 107.49859 | 11.78000 | | | |
| 5 | 73.82309 | 4.01156 | 1.829022 | 22.49 | 0.6303 |
| 6 | 129.79007 | 8.41294 | | | |
| 7 | −379.10409 | 5.47577 | 1.438750 | 94.66 | 0.5340 |
| 8 | −105.28033 | 7.25239 | | | |
| 9 | 147.66757 | 1.80080 | 1.698770 | 30.58 | 0.5970 |
| 10 | 47.29560 | 15.02239 | 1.535908 | 75.01 | 0.5393 |
| 11 | −88.60385 | 0.57336 | | | |
| 12 | 86.40309 | 4.98403 | 1.818512 | 47.06 | 0.5588 |
| 13 | 796.84325 | DD[13] | | | |
| 14 | 352.78425 | 2.69901 | 1.438750 | 94.66 | 0.5340 |
| 15 | −182.42589 | DD[15] | | | |
| 16 | 61.59625 | 1.21660 | 2.000694 | 25.46 | 0.6136 |
| 17 | 28.56184 | 7.89061 | | | |
| 18 | −42.20781 | 1.21660 | 1.592768 | 68.63 | 0.5441 |
| 19 | ∞ | 1.00044 | | | |
| 20 | ∞ | 1.22766 | 1.439172 | 94.56 | 0.5340 |
| 21 | 46.41290 | 4.05038 | 1.824376 | 22.64 | 0.6296 |
| 22 | −246.34991 | DD[22] | | | |
| 23 | −27.28239 | 1.21660 | 1.438750 | 94.66 | 0.5340 |
| 24 | −98.00172 | DD[24] | | | |
| 25(St) | ∞ | 1.55357 | | | |
| 26 | 192.59390 | 2.97629 | 1.846664 | 23.78 | 0.6192 |
| 27 | −118.91217 | 0.19910 | | | |
| 28 | 27.67749 | 9.71780 | 1.438750 | 94.66 | 0.5340 |
| 29 | −40.21965 | 1.21660 | 1.953748 | 32.32 | 0.5901 |
| 30 | 162.10282 | 7.20507 | | | |
| 31 | 231.94064 | 4.70090 | 1.805190 | 25.47 | 0.6101 |
| 32 | −50.21696 | 4.26655 | | | |
| 33 | 34.33636 | 1.21660 | 1.953748 | 32.32 | 0.5901 |
| 34 | 17.98758 | 7.55513 | 1.696797 | 55.53 | 0.5434 |
| 35 | 143.89514 | 0.57607 | | | |
| 36 | 125.04862 | 7.55378 | 1.438750 | 94.66 | 0.5340 |
| 37 | −21.83018 | 1.21660 | 1.854780 | 24.80 | 0.6123 |
| 38 | 47.27873 | 18.14463 | | | |
| 39 | 108.25480 | 3.39991 | 1.806100 | 40.93 | 0.5714 |
| 40 | −172.52255 | 0.00000 | | | |
| 41 | ∞ | 2.21200 | 1.516330 | 64.14 | 0.5353 |
| 42 | ∞ | 23.52295 | | | |

TABLE 5

Example 2

| | WIDE | MIDDLE | TELE |
|---|---|---|---|
| Zr | 1.00 | 2.00 | 3.25 |
| f | 19.57 | 39.15 | 63.62 |
| FNo. | 2.76 | 2.77 | 2.76 |

TABLE 5-continued

Example 2

|  | WIDE | MIDDLE | TELE |
|---|---|---|---|
| 2ω(°) | 81.36 | 43.00 | 27.30 |
| DD[13] | 1.40 | 14.38 | 28.98 |
| DD[15] | 1.00 | 15.53 | 16.96 |
| DD[22] | 21.63 | 5.48 | 6.24 |
| DD[24] | 29.13 | 17.78 | 0.98 |

TABLE 6

Example 2

| Lens | Surface Number | dN/dT(/° C.) | θgF + 0.001625 × vd |
|---|---|---|---|
| L41 | 23 | $-6.10 \times 10^{-6}$ | 0.6878 |
| L51 | 26 | $1.34 \times 10^{-6}$ | 0.6579 |
| L52 | 28 | $-6.10 \times 10^{-6}$ | 0.6878 |
| L53 | 29 | $4.73 \times 10^{-6}$ | 0.6427 |
| L54 | 31 | $9.00 \times 10^{-6}$ | 0.6515 |
| L55 | 33 | $4.73 \times 10^{-6}$ | 0.6427 |
| L56 | 34 | $3.98 \times 10^{-6}$ | 0.6336 |
| L57 | 36 | $-6.10 \times 10^{-6}$ | 0.6878 |
| L58 | 37 | $4.27 \times 10^{-6}$ | 0.6526 |
| L59 | 39 | $9.24 \times 10^{-6}$ | 0.6379 |

Example 3

Figure 3:
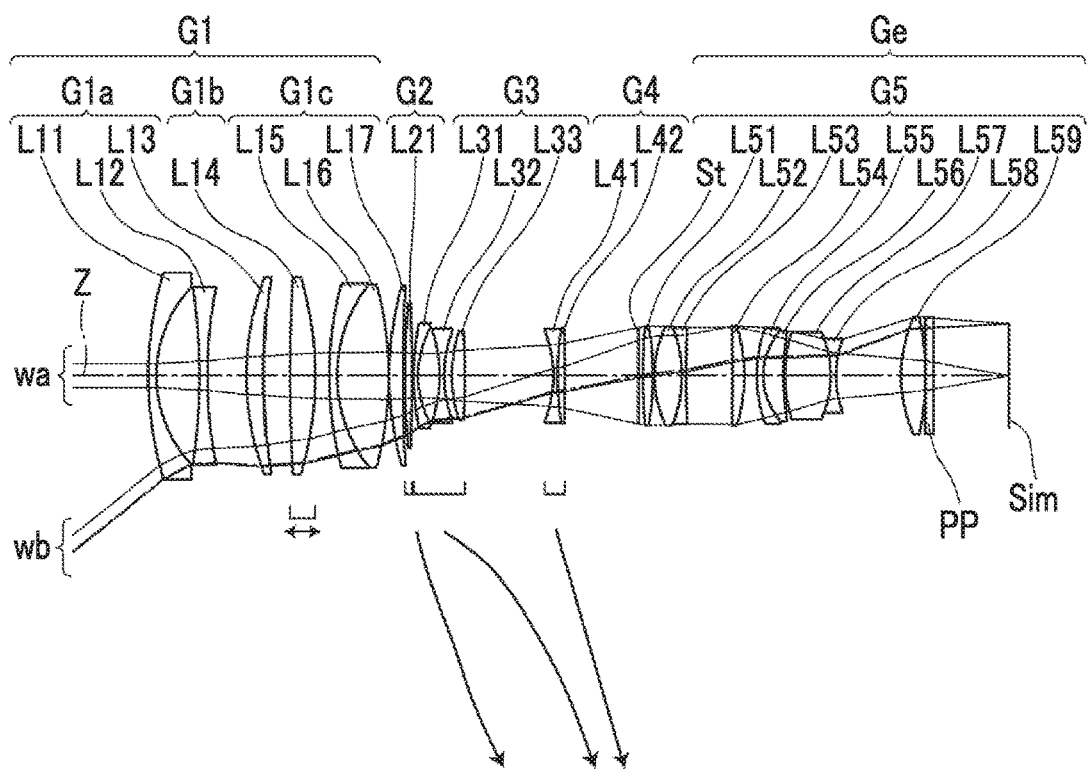
FIG. 3 is a cross-sectional view illustrating a configuration and an optical path of a zoom lens according to Example 3 of the present invention, where the upper part thereof shows the zoom lens in a wide-angle end state and the lower part thereof shows the zoom lens in a telephoto end state.
Figure 3:
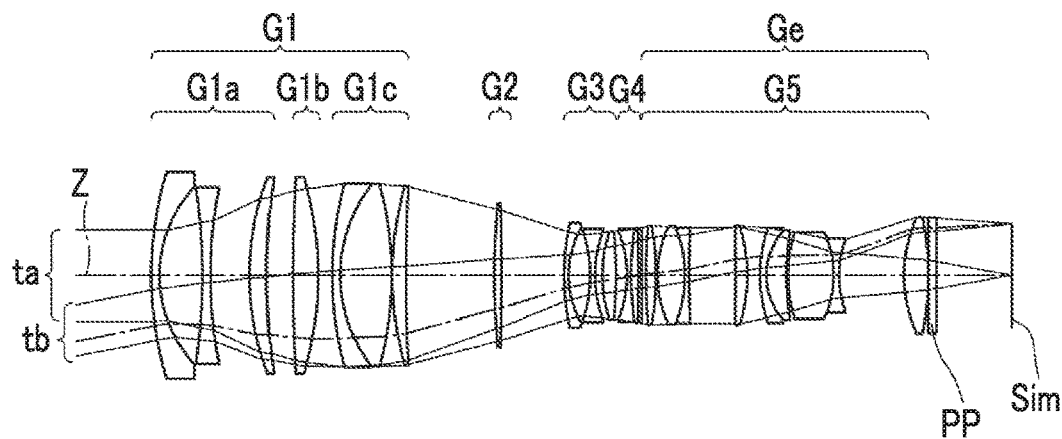
Figure 4:
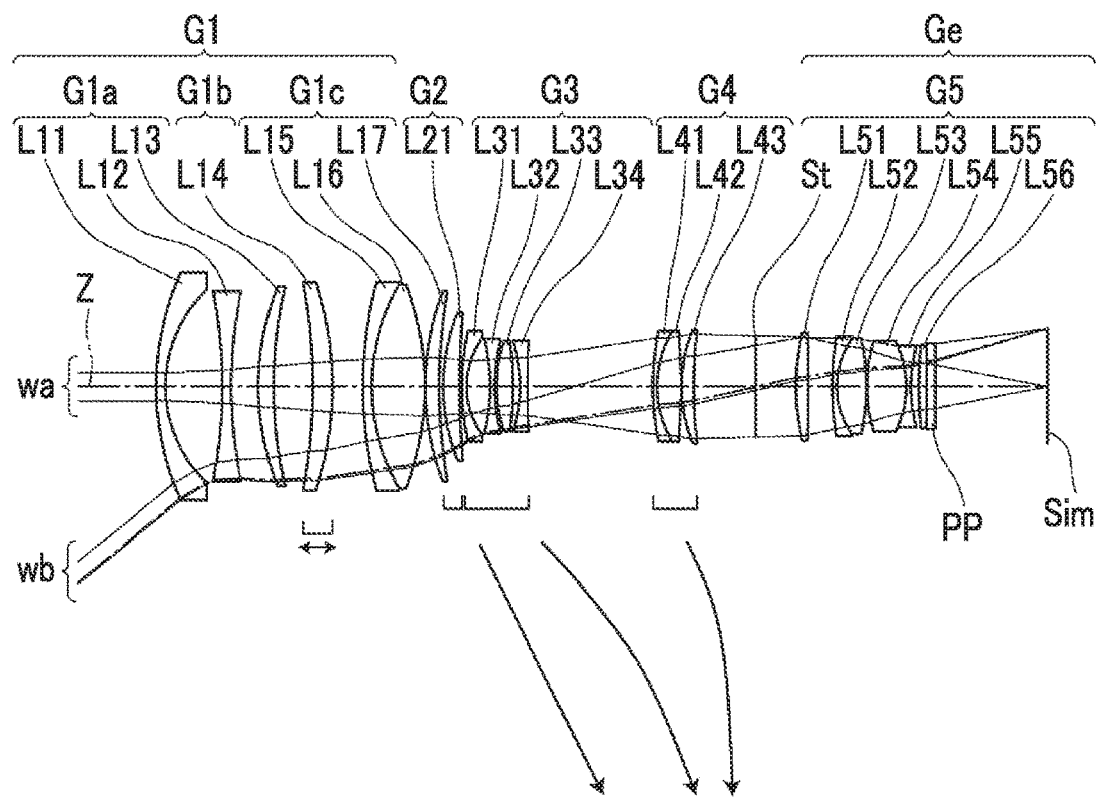
FIG. 4 is a cross-sectional view illustrating a configuration and an optical path of a zoom lens according to Example 4 of the present invention, where the upper part thereof shows the zoom lens in a wide-angle end state and the lower part thereof shows the zoom lens in a telephoto end state.
Figure 4:
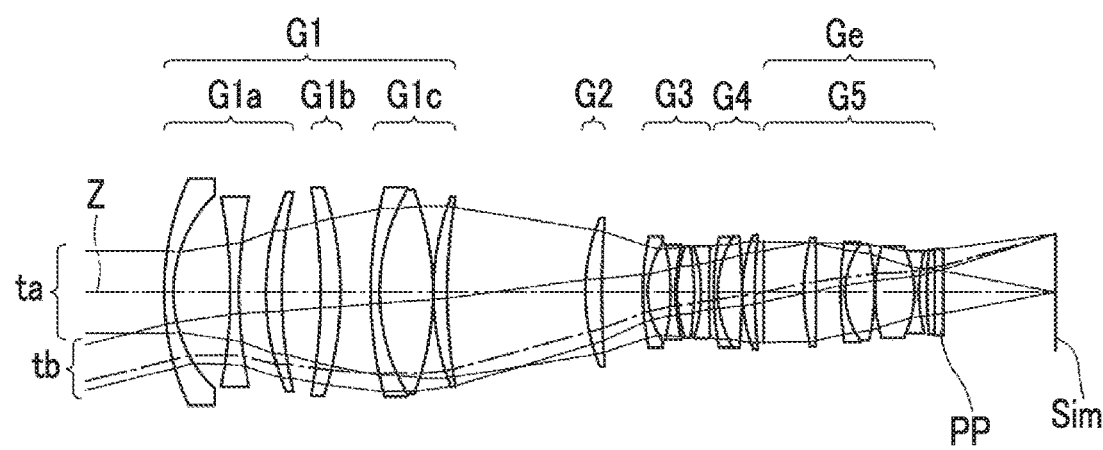

FIG. 3 shows a lens configuration and an optical path of a zoom lens of Example 3. The zoom lens of Example 3 is the same as that of Example 1 in terms of: the group configuration; the reference signs of the refractive powers of the respective lens groups; the lens groups that moves during zooming; and the lens groups that moves during focusing. The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of three lenses L31 to L33 in order from the object side. The fourth lens group G4 consists of two lenses L41 and L42 in order from the object side. The fifth lens group G5 consists of an aperture stop St and nine lenses L51 to L59 in order from the object side. The lens L52 and the lens L57 correspond to the positive ED lenses EDL.

Figure 8:
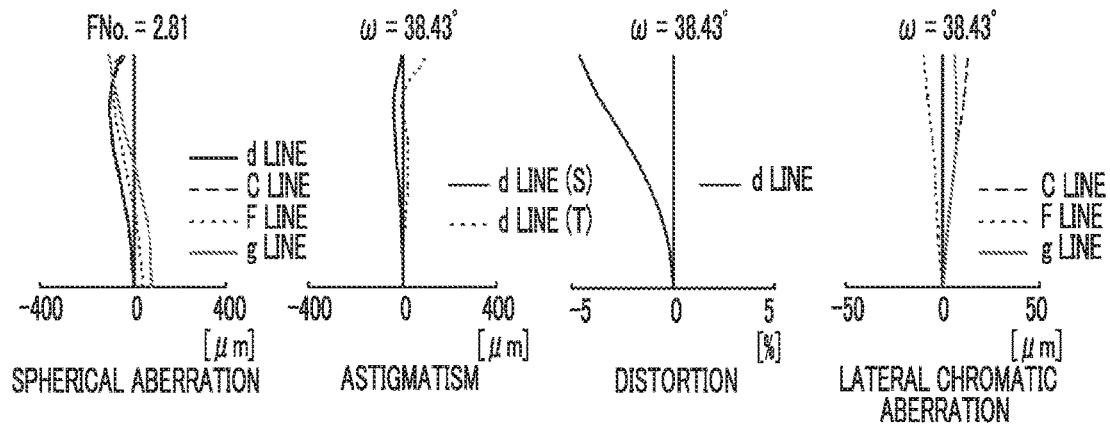
FIG. 8 is a diagram of aberrations of the zoom lens according to Example 3 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.
Figure 8:
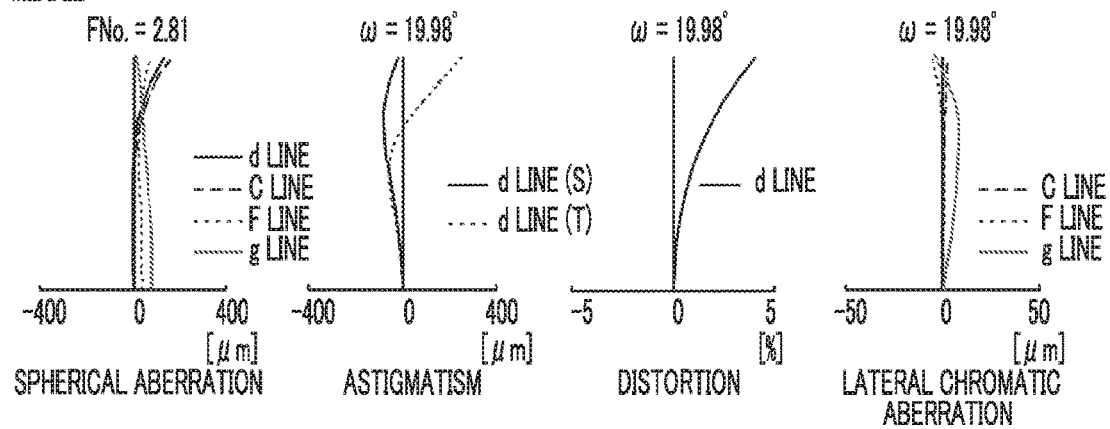
Figure 8:
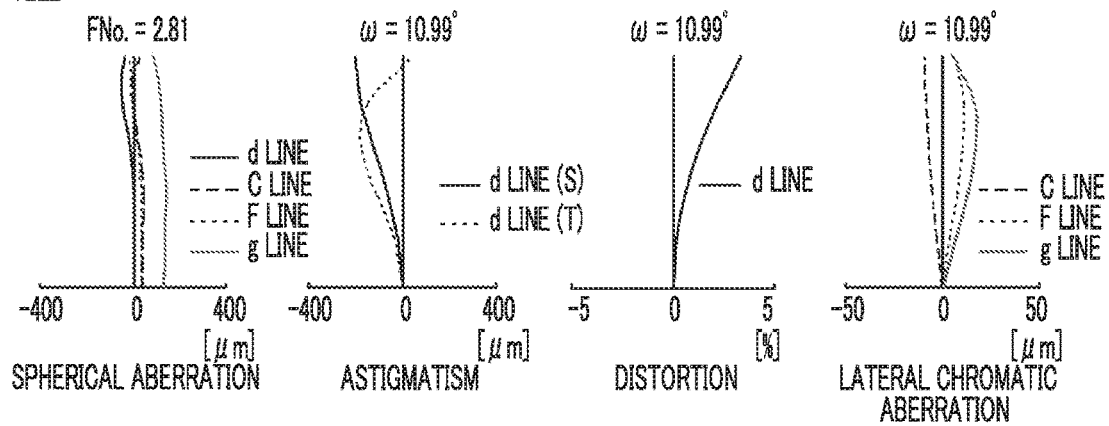

Table 7 shows basic lens data of the zoom lens of Example 3, Table 8 shows specification and variable surface distances, Table 9 shows numerical values relating to the temperature coefficient and the extraordinary low dispersion, and FIG. 8 shows aberration diagrams in a state where the object at the infinity is in focus.

TABLE 7

Example 3

| Si | Ri | Di | Ndj | vdj | θgFj |
|---|---|---|---|---|---|
| 1 | 100.49843 | 2.29978 | 1.910823 | 35.25 | 0.5822 |
| 2 | 36.60593 | 11.93997 |  |  |  |
| 3 | -170.49497 | 2.22260 | 1.882997 | 40.76 | 0.5668 |
| 4 | 123.97991 | 11.10707 |  |  |  |
| 5 | 78.56359 | 4.60994 | 1.758931 | 24.77 | 0.6206 |
| 6 | 178.29774 | 7.33912 |  |  |  |
| 7 | 485.11502 | 6.97962 | 1.496999 | 81.54 | 0.5375 |
| 8 | -96.38070 | 3.93201 |  |  |  |
| 9 | 99.29681 | 2.20205 | 1.740528 | 29.75 | 0.5996 |
| 10 | 41.15376 | 14.42472 | 1.537750 | 74.70 | 0.5394 |
| 11 | -95.75688 | 0.12000 |  |  |  |
| 12 | 91.65753 | 3.84686 | 1.836478 | 44.96 | 0.5598 |
| 13 | 49.10287 | DD[13] |  |  |  |
| 14 | 222.37466 | 2.00001 | 1.438750 | 94.66 | 0.5340 |
| 15 | -583.00409 | DD[15] |  |  |  |
| 16 | 70.44263 | 1.22561 | 1.911795 | 31.76 | 0.5931 |
| 17 | 27.53490 | 5.98172 |  |  |  |
| 18 | -40.31233 | 1.32642 | 1.496999 | 81.54 | 0.5375 |
| 19 | 35.38548 | 2.11980 |  |  |  |
| 20 | 39.75755 | 3.72341 | 1.682061 | 29.56 | 0.6079 |
| 21 | -146.86589 | DD[21] |  |  |  |
| 22 | -34.20530 | 1.16051 | 1.695602 | 59.05 | 0.5435 |
| 23 | 85.48479 | 2.05197 | 1.805190 | 25.47 | 0.6101 |
| 24 | -494.16216 | DD[24] |  |  |  |
| 25(St) | ∞ | 1.39998 |  |  |  |
| 26 | 196.89361 | 2.71797 | 1.902000 | 25.26 | 0.6166 |
| 27 | -77.71574 | 0.42870 |  |  |  |
| 28 | 32.58302 | 7.66309 | 1.438750 | 94.66 | 0.5340 |
| 29 | -36.33941 | 1.15971 | 1.903658 | 31.31 | 0.5948 |
| 30 | 285.77887 | 12.84824 |  |  |  |
| 31 | -1547.82841 | 3.36648 | 1.805190 | 25.47 | 0.6101 |
| 32 | -47.18327 | 3.51424 |  |  |  |
| 33 | 39.27414 | 1.82321 | 1.854780 | 24.80 | 0.6123 |
| 34 | 19.07778 | 5.66929 | 1.695602 | 59.05 | 0.5435 |
| 35 | 86.42178 | 0.30167 |  |  |  |
| 36 | 38.85705 | 12.74904 | 1.496999 | 81.54 | 0.5375 |
| 37 | -29.08941 | 1.47973 | 2.001003 | 29.13 | 0.5995 |
| 38 | 29.63583 | 18.40185 |  |  |  |
| 39 | 40.01005 | 6.78196 | 1.531717 | 48.84 | 0.5631 |
| 40 | -80.05392 | 0.00000 |  |  |  |
| 41 | ∞ | 2.30000 | 1.516330 | 64.14 | 0.5353 |
| 42 | ∞ | 21.01382 |  |  |  |

TABLE 8

Example 3

|  | WIDE | MIDDLE | TELE |
|---|---|---|---|
| Zr | 1.00 | 2.00 | 3.77 |
| f | 19.16 | 38.32 | 72.24 |
| FNo. | 2.81 | 2.81 | 2.81 |
| 2ω(°) | 76.86 | 39.96 | 21.98 |
| DD[13] | 0.48 | 11.12 | 24.66 |
| DD[15] | 0.48 | 14.55 | 17.67 |
| DD[21] | 24.79 | 5.78 | 3.11 |
| DD[24] | 20.46 | 14.77 | 0.78 |

TABLE 9

Example 3

| Lens | Surface Number | dN/dT(/° C.) | θgF + 0.001625 × vd |
|---|---|---|---|
| L41 | 22 | $-0.29 \times 10^{-6}$ | 0.6394 |
| L42 | 23 | $9.00 \times 10^{-6}$ | 0.6515 |
| L51 | 26 | $1.88 \times 10^{-6}$ | 0.6577 |
| L52 | 28 | $-6.10 \times 10^{-6}$ | 0.6878 |
| L53 | 29 | $3.59 \times 10^{-6}$ | 0.6457 |
| L54 | 31 | $9.00 \times 10^{-6}$ | 0.6515 |
| L55 | 33 | $4.27 \times 10^{-6}$ | 0.6526 |
| L56 | 34 | $-0.29 \times 10^{-6}$ | 0.6394 |
| L57 | 36 | $-6.05 \times 10^{-6}$ | 0.6700 |
| L58 | 37 | $4.39 \times 10^{-6}$ | 0.6469 |
| L59 | 39 | $2.01 \times 10^{-6}$ | 0.6425 |

Example 4

The zoom lens of Example 4 consists of, in order from the object side, a first lens group G1 having a positive refractive power, a second lens group G2 having a positive refractive power, a third lens group G3 having a negative refractive power, a fourth lens group G4 having a positive refractive power, and a fifth lens group G5 having a positive refractive power. The first lens group G1 consists of, in order from the object side, a first lens group front group G1a, a first lens group intermediate group G1b, and a first lens group rear group G1c. The zoom lens of Example 4 is the same as that of Example 1 in terms of the lens groups that move during zooming and the lens groups that move during focusing.

The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of four lenses L31 to L34 in order from the object side. The fourth lens group G4 consists of three lenses L41 to L43 in order from the object side. The fifth lens group G5 consists of an aperture stop St and six lenses L51 to L56 in order from the object side. The lens L53 and the lens L54 correspond to the positive ED lenses EDL.

Figure 9:
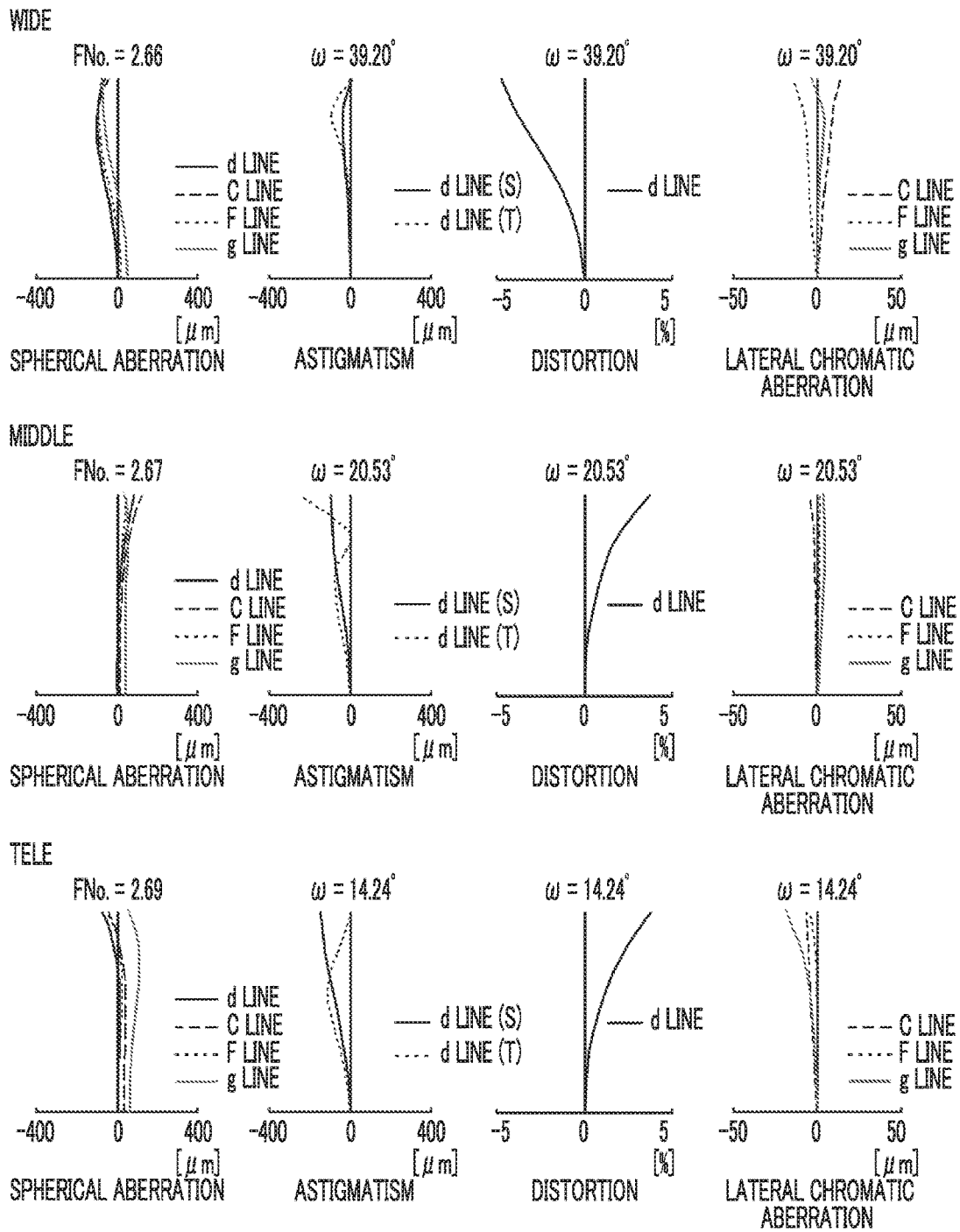
FIG. 9 is a diagram of aberrations of the zoom lens according to Example 4 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 10 shows basic lens data of the zoom lens of Example 4, Table 11 shows specification and variable surface distances, Table 12 shows numerical values relating to the temperature coefficient and the extraordinary low dispersion, and FIG. 9 shows aberration diagrams in a state where the object at the infinity is in focus.

TABLE 10

Example 4

| Si | Ri | Di | Ndj | vdj | θgFj |
|---|---|---|---|---|---|
| 1 | 69.90124 | 2.29914 | 1.910823 | 35.25 | 0.5822 |
| 2 | 33.77683 | 14.18047 | | | |
| 3 | −123.49399 | 2.20000 | 1.910823 | 35.25 | 0.5822 |
| 4 | 109.22144 | 6.92541 | | | |
| 5 | 68.34505 | 3.69958 | 1.887549 | 20.54 | 0.6387 |
| 6 | 109.39990 | 9.72622 | | | |
| 7 | −143.69959 | 4.94474 | 1.592824 | 68.62 | 0.5441 |
| 8 | −83.64868 | 7.56237 | | | |
| 9 | 102.22530 | 2.19910 | 1.831408 | 25.56 | 0.6121 |
| 10 | 50.57346 | 13.32096 | 1.537750 | 74.70 | 0.5394 |
| 11 | −72.18766 | 0.11910 | | | |
| 12 | 66.86857 | 3.48851 | 1.882997 | 40.76 | 0.5668 |
| 13 | 140.69287 | DD[13] | | | |
| 14 | 49.27160 | 4.14469 | 1.591906 | 68.75 | 0.5441 |
| 15 | 244.49775 | DD[15] | | | |
| 16 | 66.10591 | 1.20004 | 1.899996 | 38.00 | 0.5733 |
| 17 | 21.52241 | 5.81314 | | | |
| 18 | −50.64314 | 1.19913 | 1.592824 | 68.62 | 0.5441 |
| 19 | 48.62843 | 0.44273 | | | |
| 20 | 35.75799 | 4.10171 | 1.900000 | 28.97 | 0.6024 |
| 21 | −78.36956 | 1.77775 | | | |
| 22 | −37.79989 | 2.00055 | 1.825373 | 46.55 | 0.5538 |
| 23 | 227.10414 | DD[23] | | | |
| 24 | 69.33326 | 1.05061 | 1.903658 | 31.31 | 0.5948 |
| 25 | 27.03898 | 5.98164 | 1.438750 | 94.66 | 0.5340 |
| 26 | −156.72089 | 0.15000 | | | |
| 27 | 39.24450 | 3.04102 | 1.846669 | 23.83 | 0.6190 |
| 28 | 122.27784 | DD[28] | | | |
| 29(St) | ∞ | 10.00000 | | | |
| 30 | 60.37973 | 3.05899 | 1.851500 | 40.78 | 0.5696 |
| 31 | −534.13118 | 6.04331 | | | |
| 32 | 82.30479 | 1.09910 | 1.698947 | 30.13 | 0.6030 |
| 33 | 21.04331 | 7.37819 | 1.537750 | 74.70 | 0.5394 |
| 34 | −56.40670 | 0.12000 | | | |
| 35 | 39.87246 | 9.79328 | 1.438750 | 94.66 | 0.5340 |
| 36 | −26.18031 | 1.20003 | 1.953748 | 32.32 | 0.5901 |
| 37 | 38.73573 | 2.04078 | | | |
| 38 | 136.05682 | 2.00022 | 1.846669 | 23.83 | 0.6190 |
| 39 | −298.83333 | 0.00000 | | | |
| 40 | ∞ | 2.30000 | 1.516330 | 64.14 | 0.5353 |
| 41 | ∞ | 28.03316 | | | |

TABLE 11

Example 4

| | WIDE | MIDDLE | TELE |
|---|---|---|---|
| Zr | 1.00 | 2.00 | 2.95 |
| f | 18.67 | 37.34 | 55.07 |
| FNo. | 2.66 | 2.67 | 2.69 |
| 2ω(°) | 78.40 | 41.06 | 28.48 |
| DD[13] | 0.98 | 19.02 | 34.64 |
| DD[15] | 0.51 | 9.94 | 10.23 |
| DD[23] | 31.37 | 14.71 | 1.18 |
| DD[28] | 15.52 | 4.70 | 2.32 |

TABLE 12

Example 4
Surface

| Lens | Surface Number | dN/dT(/° C.) | θgF + 0.001625 × vd |
|---|---|---|---|
| L41 | 24 | 3.59 × 10$^{-6}$ | 0.6457 |
| L42 | 25 | −6.10 × 10$^{-6}$ | 0.6878 |
| L43 | 27 | 10.04 × 10$^{-6}$ | 0.6577 |
| L51 | 30 | 5.33 × 10$^{-6}$ | 0.6358 |
| L52 | 32 | 3.51 × 10$^{-6}$ | 0.6519 |
| L53 | 33 | −4.21 × 10$^{-6}$ | 0.6607 |
| L54 | 35 | −6.10 × 10$^{-6}$ | 0.6878 |
| L55 | 36 | 4.73 × 10$^{-6}$ | 0.6427 |
| L56 | 38 | 10.04 × 10$^{-6}$ | 0.6577 |

Example 5

Figure 5:
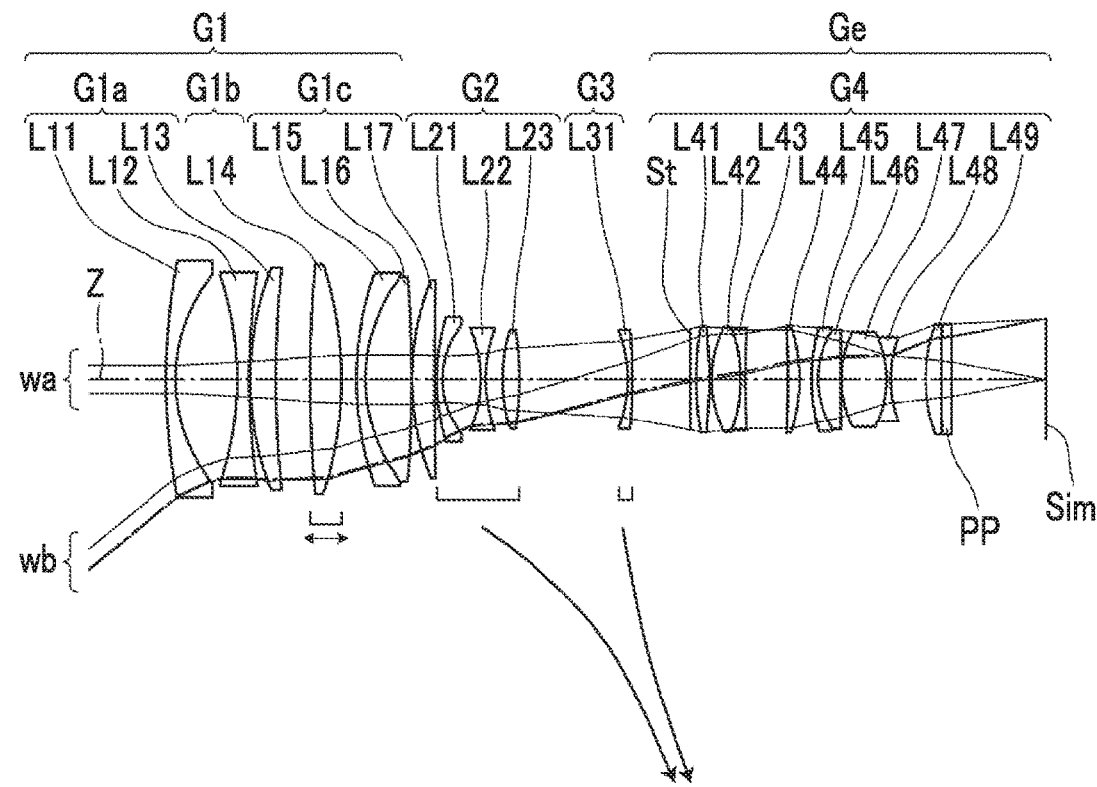
FIG. 5 is a cross-sectional view illustrating a configuration and an optical path of a zoom lens according to Example 5 of the present invention, where the upper part thereof shows the zoom lens in a wide-angle end state and the lower part thereof shows the zoom lens in a telephoto end state.
Figure 5:
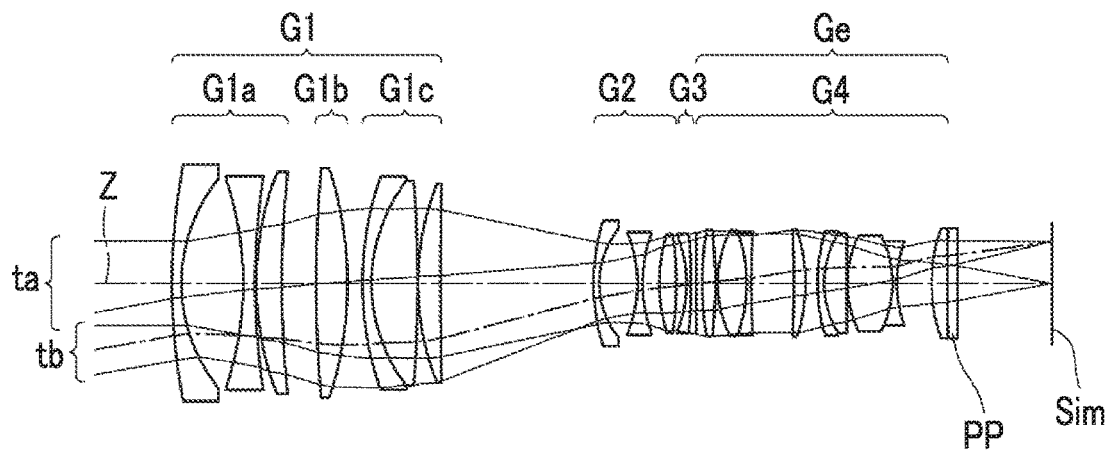

FIG. 5 shows a lens configuration and an optical path of a zoom lens of Example 5. The zoom lens of Example 5 consists of, in order from the object side, a first lens group G1 having a positive refractive power, a second lens group G2 having a negative refractive power, a third lens group G3 having a negative refractive power, and a fourth lens group G4 having a positive refractive power. The movable lens groups are the second lens group G2 and the third lens group G3, and the final lens group Ge is the fourth lens group G4. The first lens group G1 consists of, in order from the object side, a first lens group front group G1a, a first lens group intermediate group G1b, and a first lens group rear group G1c. The lens groups that move during focusing in the zoom lens of Example 5 are the same as those in Example 1.

The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of three lenses L21 to lens L23, the third lens group G3 consists of one lens L31, and the fourth lens group G4 consists of, in order from the object side, an aperture stop St, and nine lenses L41 to L49. The lens L42, the lens L46, and the lens L47 correspond to the positive ED lenses EDL.

Figure 10:
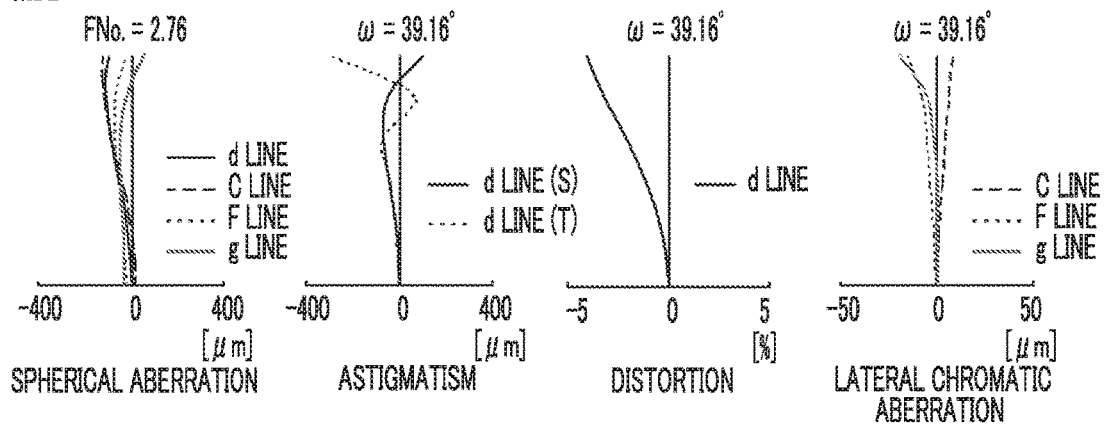
FIG. 10 is a diagram of aberrations of the zoom lens according to Example 5 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.
Figure 10:
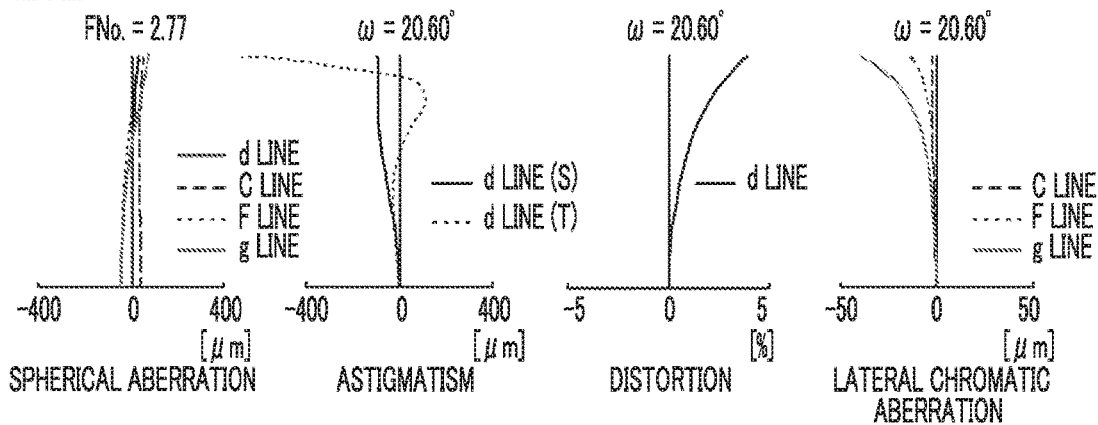
Figure 10:
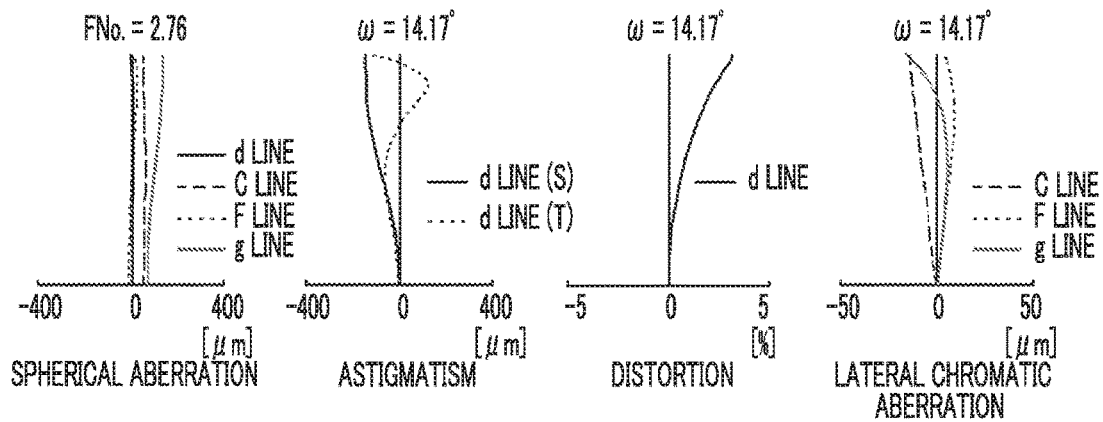

The zoom lens of Example 5 includes an aspheric surface. Table 13 shows basic lens data of the zoom lens of Example 5, Table 14 shows specification and variable surface distances, Table 15 shows aspheric coefficients, Table 16 shows numerical values relating to the temperature coefficient and the extraordinary low dispersion, and FIG. 10 shows aberration diagrams in a state where the object at the infinity is in focus.

In Table 13, the reference sign * is attached to surface numbers of aspheric surfaces, and numerical values of the paraxial radius of curvature are written into the column of the radius of curvature of the aspheric surface. Table 15 shows the aspherical coefficients of the respective aspheric surfaces. The "E±n" (n: an integer) in numerical values of the aspheric coefficients of Table 15 indicates "×10$^{\pm n}$". The aspheric coefficients are values of the coefficients KA and Am (m=3, 4, 5, . . . 16) in aspheric surface expression represented as the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface).

C is a paraxial curvature, and

KA and Am are aspheric coefficients.

TABLE 13

Example 5

| Si | Ri | Di | Ndj | vdj | θgFj |
|---|---|---|---|---|---|
| 1 | 149.58193 | 2.30075 | 1.886531 | 37.65 | 0.5768 |
| 2 | 40.00102 | 14.79694 | | | |
| 3 | −77.17279 | 2.99948 | 1.758882 | 52.05 | 0.5482 |
| 4 | 167.85513 | 0.28969 | | | |
| 5 | 74.10634 | 6.10706 | 1.570416 | 41.80 | 0.5760 |
| 6 | 248.09391 | 8.26200 | | | |
| 7 | 313.03316 | 7.49957 | 1.703736 | 58.69 | 0.5417 |
| 8 | −88.77229 | 3.60105 | | | |
| 9 | 77.54887 | 2.19910 | 1.891715 | 30.73 | 0.5970 |
| 10 | 40.61518 | 11.02090 | 1.580228 | 69.93 | 0.5425 |
| 11 | −319.65754 | 0.11984 | | | |
| 12 | 65.37292 | 5.38751 | 1.776237 | 50.22 | 0.5508 |
| 13 | 1103.86840 | DD[13] | | | |
| *14 | 50.32349 | 1.38000 | 1.806250 | 40.91 | 0.5692 |
| *15 | 20.43959 | 9.15460 | | | |
| 16 | −31.68883 | 1.20000 | 1.439988 | 88.59 | 0.5309 |
| 17 | 33.69659 | 4.07286 | | | |
| 18 | 41.18699 | 4.03696 | 1.592701 | 35.31 | 0.5934 |
| 19 | −77.22259 | DD[19] | | | |
| 20 | −31.67694 | 1.05000 | 1.496999 | 81.54 | 0.5375 |
| 21 | −140.06771 | DD[21] | | | |
| 22(St) | ∞ | 1.40000 | | | |
| 23 | 73.10600 | 3.15534 | 1.846669 | 23.83 | 0.6190 |
| 24 | −111.68902 | 0.56571 | | | |
| 25 | 28.52079 | 6.96879 | 1.438750 | 94.66 | 0.5340 |
| 26 | −36.19576 | 1.10037 | 2.000694 | 25.46 | 0.6136 |
| 27 | 208.32059 | 10.20929 | | | |
| 28 | −232.08385 | 2.79753 | 1.846669 | 23.83 | 0.6190 |
| 29 | −40.45674 | 2.91237 | | | |
| 30 | 45.95846 | 1.51794 | 1.882997 | 40.76 | 0.5668 |
| 31 | 21.45899 | 5.60907 | 1.595220 | 67.73 | 0.5443 |

TABLE 13-continued

Example 5

| Si | Ri | Di | Ndj | vdj | θgFj |
|---|---|---|---|---|---|
| 32 | 2223.13439 | 0.15227 | | | |
| 33 | 25.66119 | 10.86053 | 1.438750 | 94.66 | 0.5340 |
| 34 | −24.93505 | 1.00000 | 2.000694 | 25.46 | 0.6136 |
| 35 | 28.91154 | 8.45114 | | | |
| 36 | 36.09432 | 3.95847 | 1.672700 | 32.10 | 0.5989 |
| 37 | 1057.04753 | 0.00000 | | | |
| 38 | ∞ | 2.30000 | 1.516330 | 64.14 | 0.5353 |
| 39 | ∞ | 22.71900 | | | |

TABLE 14

Example 5

| | WIDE | MIDDLE | TELE |
|---|---|---|---|
| Zr | 1.00 | 2.00 | 3.00 |
| f | 18.56 | 37.11 | 55.67 |
| FNo. | 2.76 | 2.77 | 2.76 |
| 2ω(°) | 78.32 | 41.20 | 28.34 |
| DD[13] | 0.51 | 26.15 | 36.64 |
| DD[19] | 25.95 | 4.60 | 2.45 |
| DD[21] | 13.93 | 9.63 | 1.29 |

TABLE 15

Example 5

| Surface Number | 14 | 15 |
|---|---|---|
| KA | 1.0747168E+00 | 8.3699483E−01 |
| A3 | 0.0000000E+00 | 0.0000000E+00 |
| A4 | 2.4942517E−07 | −6.5515856E−07 |
| A5 | 6.1846613E−10 | −8.2860005E−09 |
| A6 | −5.4371231E−12 | −5.0901284E−10 |
| A7 | −9.3189903E−14 | −6.9997049E−11 |
| A8 | 1.8611123E−16 | −2.5111219E−12 |
| A9 | 1.0943937E−18 | −9.7270177E−14 |
| A10 | 1.0621243E−20 | 2.0028703E−14 |
| A11 | 4.2843973E−23 | 7.0725121E−16 |
| A12 | 7.2537620E−26 | 4.7530540E−16 |
| A13 | 1.3502441E−27 | 1.6462908E−18 |
| A14 | 3.6045534E−29 | 1.6389779E−19 |
| A15 | 2.7454534E−33 | −5.0308933E−20 |
| A16 | −4.5590756E−35 | −1.0707688E−20 |

TABLE 16

Example 5

| Lens | Surface Number | dN/dT(/° C.) | θgF + 0.001625 × vd |
|---|---|---|---|
| L31 | 20 | −6.05 × 10$^{-6}$ | 0.6700 |
| L41 | 23 | 10.04 × 10$^{-6}$ | 0.6577 |
| L42 | 25 | −6.10 × 10$^{-6}$ | 0.6878 |
| L43 | 26 | 4.77 × 10$^{-6}$ | 0.6550 |
| L44 | 28 | 10.04 × 10$^{-6}$ | 0.6577 |
| L45 | 30 | 4.79 × 10$^{-6}$ | 0.6330 |
| L46 | 31 | −5.88 × 10$^{-6}$ | 0.6543 |
| L47 | 33 | −6.10 × 10$^{-6}$ | 0.6878 |
| L48 | 34 | 4.77 × 10$^{-6}$ | 0.6550 |
| L49 | 36 | 2.91 × 10$^{-6}$ | 0.6511 |

Table 17 shows values corresponding to Conditional Expressions (1) to (11) of the zoom lenses of Examples 1 to 5. In Table 17, in the places of the values corresponding to Conditional Expressions (1) and (2), the reference signs of the corresponding lenses are noted in parentheses. Values other than the partial dispersion ratio in Table 17 are based on the d line.

The present invention has been hitherto described through embodiments and examples, but the present invention is not limited to the above-mentioned embodiments and examples,

TABLE 17

| Expression Number | Conditional Expression | Example 1 | Example 2 | Example 3 | Example 4 | Example 5 |
|---|---|---|---|---|---|---|
| (1) | vd | 94.66 (L52) | 94.66 (L52) | 94.66 (L52) | 74.70 (L53) | 94.66 (L42) |
|  |  | 94.66 (L57) | 94.66 (L57) | 81.54 (L57) | 94.66 (L54) | 67.73 (L46) |
|  |  | — | — | — | — | 94.66 (L47) |
| (2) | $\theta gF + 0.001625 \times vd$ | 0.6878 (L52) | 0.6878 (L52) | 0.6878 (L52) | 0.6607 (L53) | 0.6878 (L42) |
|  |  | 0.6878 (L57) | 0.6878 (L57) | 0.6700 (L57) | 0.6878 (L54) | 0.6543 (L46) |
|  |  | — | — | — | — | 0.6878 (L47) |
| (3) | (dN/dT)aveB | $8.07 \times 10^{-6}$ | $5.89 \times 10^{-6}$ | $4.32 \times 10^{-6}$ | $6.35 \times 10^{-6}$ | $7.66 \times 10^{-6}$ |
| (4) | (dN/dT)aveA | $3.34 \times 10^{-6}$ | $1.89 \times 10^{-6}$ | $1.35 \times 10^{-6}$ | $1.50 \times 10^{-6}$ | $0.82 \times 10^{-6}$ |
| (5) | $(\theta gF + 0.001625 \times vd)aveA$ | 0.659 | 0.659 | 0.657 | 0.665 | 0.666 |
| (6) | $(1/\phi Ge) \times \Sigma\phi i \times (dNi/dT)$ | $-8.4 \times 10^{-6}$ | $-13.2 \times 10^{-6}$ | $-24.6 \times 10^{-6}$ | $-42.5 \times 10^{-6}$ | $-22.1 \times 10^{-6}$ |
| (7) | $ft \times (\tan\omega t)/fGe$ | 0.36 | 0.34 | 0.29 | 0.18 | 0.41 |
| (8) | DD2/DD1 | 0.73 | 0.69 | 0.68 | 0.88 | 0.79 |
| (9) | Ndp | 1.84666 | 1.84666 | 1.90200 | 1.85150 | 1.84666 |
| (10) | $\theta gFp + 0.001625 \times vdp$ | 0.6577 | 0.6579 | 0.6577 | 0.6358 | 0.6577 |
| (11) | $\beta Gew$ | -0.87 | -0.88 | -1.15 | 0.14 | -0.99 |

Figure 11:
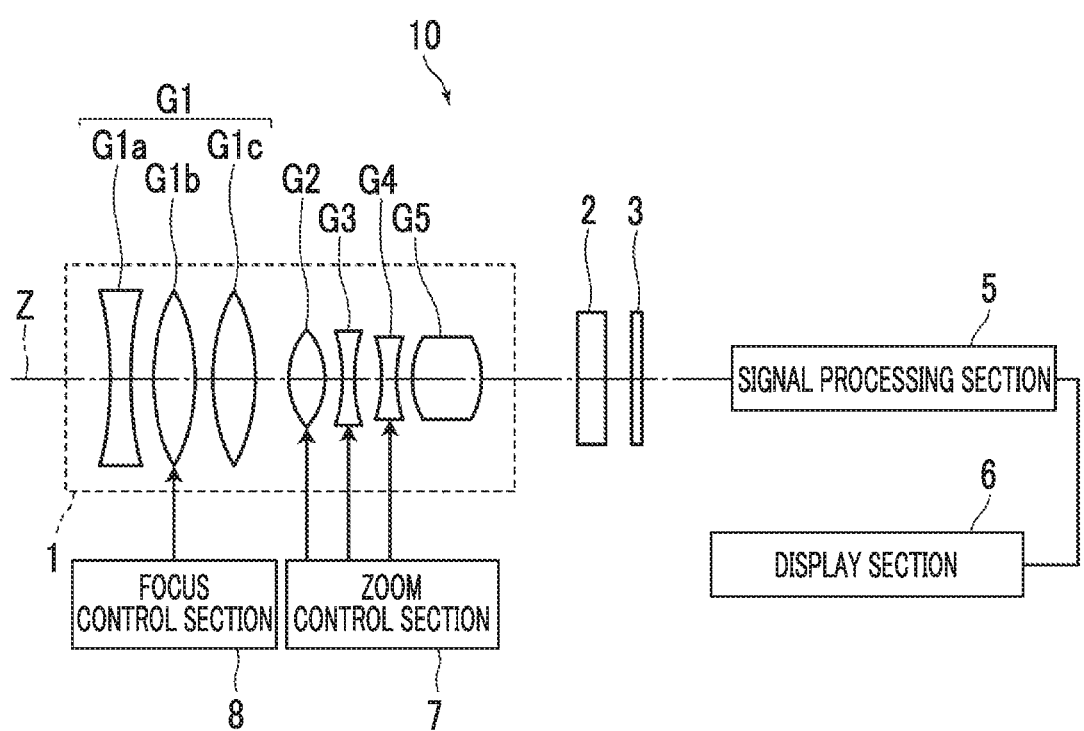
FIG. 11 is a schematic configuration diagram of an imaging apparatus according to an embodiment of the present invention.

Next, an imaging apparatus according to an embodiment of the present invention will be described. FIG. 11 is a schematic configuration diagram of an imaging apparatus 10 using the zoom lens 1 according to the embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 11 schematically shows the first lens group front group G1a, the first lens group intermediate group G1b, the first lens group rear group G1c, and the second to fifth lens groups G2 to G5 included in the zoom lens 1. However, the number of lens groups included in the zoom lens 1 of FIG. 11 is an example, and the imaging apparatus of the present invention can be composed of a number of lens groups different from that in the example of FIG. 11.

The imaging element 3 captures an image of a subject, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 11 shows only one imaging element 3, but the imaging apparatus of the present invention is not limited to this, and may be a so-called three-plate imaging device having three imaging elements.

and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:

1. A zoom lens consisting of, in order from an object side:
    a first lens group that has a positive refractive power and remains stationary with respect to an image plane during zooming;
    a plurality of movable lens groups that move by changing distances in a direction of an optical axis between groups adjacent to each other during zooming; and
    a final lens group that has positive refractive power and remains stationary with respect to the image plane during zooming,
    wherein the final lens group has at least two positive ED lenses formed of a lens material satisfying Conditional Expressions (1) and (2),
    wherein at least one of the movable lens group closest to an image side and the final lens group has at least one positive lens other than the positive ED lenses, and
    wherein all Conditional Expressions (3) to (5) are satisfied, $$62 < vd \quad (1)$$

$$0.64 < \theta gF + 0.001625 \times vd < 0.70 \quad (2)$$

$$4.0 \times 10^{-6} < (dN/dT)aveB < 8.2 \times 10^{-6} \quad (3)$$

$$0.7 \times 10^{-6} < (dN/dT)aveA < 4.0 \times 10^{-6} \quad (4)$$

$$0.655 < (\theta gF + 0.001625 \times vd)aveA < 0.670 \quad (5)$$

where vd is an Abbe number of the lens material at a d line,
θgF is a partial dispersion ratio of the lens material between a g line and an F line, (dN/dT)aveB is an average value of dN/dT of positive lenses other than the positive ED lenses in the movable lens group closest to the image side and the final lens group, (dN/dT)aveA is an average value of dN/dT of positive lenses in the movable lens group closest to the image side and the final lens group, (θgF+0.001625×vd)aveA is an average value of θgF+0.001625×vd of the positive lenses in the movable lens group closest to the image side and the final lens group, and dN/dT is defined as a temperature coefficient of a refractive index in air at the d line, and is an average value in a temperature range of 0° C. to 40° C.

2. The zoom lens according to claim 1, herein Conditional Expression (6) is satisfied, $$-45 \times 10^{-6} < \frac{1}{\Phi Ge} \sum_{i=1}^{k} \Phi i \times (dNi/dT) < -5 \times 10^{-6} \quad (6)$$

where ΦGe is a refractive power of the final lens group,
k is the number of lenses in the movable lens group closest to the image side and the final lens group,
Φi is a refractive power of an i-th lens from the object side in the movable lens group closest to the image side and the final lens group, and
dNi/dT is dN/dT of the i-th lens from the object side in the movable lens group closest to the image side and the final lens group.

3. The zoom lens according to claim 1, wherein Conditional Expression (7) is satisfied, $$0.15 < ft \times (\tan \omega t)/fGe < 0.5 \quad (7),$$

where ft is a focal length of the zoom lens at the telephoto end in a state where an object at infinity is in focus,
ωt is a maximum half angle of view of the zoom lens at the telephoto end in a state where the object at infinity is in focus, and
fGe is a focal length of the final lens group.

4. The zoom lens according to claim 1,
wherein a lens closest to the image side in the final lens group is a positive lens, and
wherein Conditional Expression (8) is satisfied, $$0.65 < DD2/DD1 < 0.85 \quad (8),$$

where DD2 is a distance on the optical axis between a lens surface closest to the object side in the final lens group and an image side lens surface of a second lens from the image side, and
DD1 is a distance on the optical axis between the lens surface closest to the object side in the final lens group and a lens surface closest to the image side.

5. The zoom lens according to claim 1,
wherein a lens closest to the object side in the final lens group is a positive lens, and
wherein Conditional Expressions (9) and (10) are satisfied, $$1.8 < Ndp \quad (9), \text{ and}$$

$$0.65 < \theta gFp + 0.001625 \times vdp < 0.67 \quad (10),$$

where Ndp is a refractive index of the positive lens closest to the object side in the final lens group at the d line,
θgFp is a partial dispersion ratio of the positive lens closest to the object side in the final lens group between the g line and the F line, and
vdp is an Abbe number of the positive lens closest to the object side in the final lens group at the d line.

6. The zoom lens according to claim 1, wherein the final lens group has, successively in order from a position closest to the object side, a positive lens, and a cemented lens that is formed by cementing two lenses having refractive powers of which the signs are different from each other.

7. The zoom lens according to claim 1, wherein focusing is performed by moving at least one lens in the first lens group in a direction of the optical axis.

8. The zoom lens according to claim 1, wherein the first lens group consists of, in order from the object side, a first lens group front group that has a negative refractive power and remains stationary with respect to the image plane during focusing, a first lens group intermediate group that has a positive refractive power and moves in the direction of the optical axis during focusing, and a first lens group rear group that is set such that a distance in the direction of the optical axis between the first lens group rear group and the first lens group intermediate group changes during focusing and has a positive refractive power.

9. The zoom lens according to claim 1, wherein the final lens group consists of ten or less lenses.

10. The zoom lens according to claim 1, wherein the movable lens group closest to the image side has a negative refractive power.

11. The zoom lens according to claim 1, wherein Conditional Expression (11) is satisfied, $$-2.0 < \beta Gew < -0.8 \quad (11),$$

where βGew is a lateral magnification of the final lens group at a wide-angle end in a state where the object at infinity is in focus.

12. The zoom lens according to claim 1, wherein Conditional Expression (3-1) is satisfied.

$$4.1 \times 10^{-6} < (dN/dT)aveB < 8.1 \times 10^{-6} \quad (3-1)$$

13. The zoom lens according to claim 1, wherein Conditional Expression (4-1) is satisfied.

$$0.8 \times 10^{-6} < (dN/dT)aveA < 3.5 \times 10^{-6} \quad (4-1)$$

14. The zoom lens according to claim 1, wherein the at least two positive ED lenses of the final lens group is formed of a lens material satisfying at least one of Conditional Expression (1-1) or (2-1).

$$70 < vd < 100 \quad (1-1)$$

$$0.65 < \theta gF + 0.001625 \times vd < 0.69 \quad (2-1)$$

15. The zoom lens according to claim 2, wherein Conditional Expression (6-1) is satisfied, $$-25 \times 10^{-6} < \frac{1}{\Phi Ge} \sum_{i=1}^{k} \Phi i \times (dNi/dT) < -5 \times 10^{-6} \quad (6-1)$$

16. The zoom lens according to claim 3, wherein Conditional Expression (7-1) is satisfied.

$$0.25 < ft \times (\tan \omega t)/fGe < 0.45 \quad (7-1)$$

17. The zoom lens according to claim 4, wherein Conditional Expression (8-1) is satisfied.

$$0.67 < DD2/DD1 < 0.81 \quad (8-1)$$

18. The zoom lens according to claim 5, wherein at least one of Conditional Expression (9-1) or (10-1) is satisfied.

$$1.8 < Ndp < 1.95 \qquad (9\text{-}1)$$

$$0.65 < \theta gFp + 0.001625 \times vdp < 0.66 \qquad (10\text{-}1)$$

19. The zoom lens according to claim 11, wherein Conditional Expression (11-1) is satisfied.

$$-1.2 < \beta Gew < -0.82 \qquad (11\text{-}1)$$

20. An imaging apparatus comprising the zoom lens according to claim 1.

* * * * *